(12) United States Patent
Patchett et al.

(10) Patent No.: US 8,318,286 B2
(45) Date of Patent: Nov. 27, 2012

(54) GAS CATALYSTS COMPRISING POROUS WALL HONEYCOMBS

(75) Inventors: Joseph Patchett, Basking Ridge, NJ (US); Edgar V. Hünnekes, Wunstorf (DE)

(73) Assignee: BASF Corporation, Florham Park, NJ (US)

( * ) Notice: Subject to any disclaimer, the term of this patent is extended or adjusted under 35 U.S.C. 154(b) by 1185 days.

(21) Appl. No.: 12/022,338

(22) Filed: Jan. 30, 2008

(65) Prior Publication Data

US 2008/0317999 A1    Dec. 25, 2008

Related U.S. Application Data

(60) Provisional application No. 60/887,533, filed on Jan. 31, 2007.

(51) Int. Cl.
*B32B 3/12* (2006.01)
*B05D 5/00* (2006.01)
*F01N 3/022* (2006.01)
*B01D 39/20* (2006.01)
*B01D 53/56* (2006.01)

(52) U.S. Cl. .......... 428/117; 427/243; 422/180; 60/274; 60/301; 55/523; 55/524

(58) Field of Classification Search .................. None
See application file for complete search history.

(56) References Cited

U.S. PATENT DOCUMENTS

| | | |
|---|---|---|
| 2,975,025 A | 3/1961 | Cohn et al. |
| 3,328,115 A | 6/1967 | Keith et al. |
| 3,331,787 A | 7/1967 | Keith et al. |
| 3,565,830 A | 2/1971 | Keith et al. |
| 4,010,238 A | 3/1977 | Shiraishi et al. |
| 4,085,193 A | 4/1978 | Nakajima et al. |
| 4,119,701 A | 10/1978 | Fedor et al. |
| 4,157,375 A | 6/1979 | Brown |
| 4,285,838 A | 8/1981 | Ishida et al. |
| 4,370,262 A | 1/1983 | Takahashi et al. |
| 4,446,250 A | 5/1984 | Niwa et al. |
| 4,451,517 A | 5/1984 | Inoguchi et al. |
| 4,455,281 A | 6/1984 | Ishida et al. |
| 4,522,940 A | 6/1985 | Sambrook |
| 4,628,042 A | 12/1986 | Speronello |
| 4,637,995 A | 1/1987 | DeAngelis et al. |

(Continued)

FOREIGN PATENT DOCUMENTS

DE    102004040548    2/2006

(Continued)

OTHER PUBLICATIONS

Williams, J. L., et al., "Washcoat-In-The-Wall Honeycomb Catalysts for SCR of NOx", *Corning Glass Works*, (1989), 1-16.

(Continued)

*Primary Examiner* — David Sample
(74) *Attorney, Agent, or Firm* — Melanie L. Brown

(57) ABSTRACT

Embodiments of the invention pertain to a catalyst, which may be used in a catalytic converter for treating a gas stream containing pollutants. In an embodiment, the catalyst comprises a substrate having a plurality of axially enclosed channels defined by the porous wall elements extending between an inlet end and an outlet end. Washcoat particles are disposed substantially within the pores of the walls, and the surfaces of the wall elements have a porous, rough texture after coating with the washcoat and substantially no fillets formed on the channels.

23 Claims, 12 Drawing Sheets

U.S. PATENT DOCUMENTS

| | | | |
|---|---|---|---|
| 4,888,317 | A | 12/1989 | DeAngelis et al. |
| 4,961,917 | A | 10/1990 | Byrne |
| 5,155,083 | A | 10/1992 | Yoshida et al. |
| 5,157,010 | A | 10/1992 | Maus et al. |
| 5,334,570 | A * | 8/1994 | Beauseigneur et al. ...... 502/304 |
| 5,516,497 | A | 5/1996 | Speronello et al. |
| 5,716,899 | A | 2/1998 | Guile et al. |
| 6,649,244 | B2 | 11/2003 | Hamanaka et al. |
| 7,132,150 | B2 | 11/2006 | Ogunwumi et al. |
| 7,211,232 | B1 | 5/2007 | Zuberi |
| 7,229,597 | B2 | 6/2007 | Patchett et al. |
| 7,306,771 | B2 | 12/2007 | Okawara |
| 2004/0053781 | A1* | 3/2004 | Okawara ..................... 502/304 |
| 2005/0031514 | A1 | 2/2005 | Patchett et al. |
| 2005/0129588 | A1* | 6/2005 | Nunan .......................... 422/177 |
| 2006/0115403 | A1 | 6/2006 | Yuen |
| 2006/0133969 | A1* | 6/2006 | Chiffey et al. ................ 422/168 |
| 2006/0183636 | A1* | 8/2006 | Klein et al. ................... 502/261 |
| 2006/0210822 | A1 | 9/2006 | Ono |
| 2006/0248874 | A1* | 11/2006 | Goersmann et al. ............ 60/274 |
| 2006/0251549 | A1* | 11/2006 | Kumar et al. ................. 422/180 |
| 2007/0119134 | A1* | 5/2007 | Beall et al. ..................... 55/523 |
| 2007/0119135 | A1* | 5/2007 | Miao et al. ..................... 55/523 |
| 2007/0140928 | A1 | 6/2007 | Beall et al. |
| 2007/0191217 | A1* | 8/2007 | Twigg ........................... 502/254 |
| 2008/0125316 | A1 | 5/2008 | Noda et al. |
| 2009/0087613 | A1* | 4/2009 | Lu et al. ........................ 428/117 |
| 2009/0129995 | A1 | 5/2009 | Pfeifer et al. |
| 2009/0305874 | A1 | 12/2009 | Pfeifer et al. |
| 2010/0170230 | A1* | 7/2010 | Chiffey et al. .................. 60/297 |

FOREIGN PATENT DOCUMENTS

| | | |
|---|---|---|
| DE | 102005062317 | 7/2007 |
| EP | 0766993 | 4/1997 |
| EP | 1663458 | 1/2009 |
| JP | 02230538 | 9/1990 |
| JP | 9-220423 | 8/1997 |
| JP | 11-021275 | 1/1999 |
| JP | 2005262144 | 9/2005 |
| JP | 2007021409 | 2/2007 |
| WO | WO-2004/069397 | 8/2004 |
| WO | WO-2005/084806 | 9/2005 |
| WO | WO-2006/021336 | 3/2006 |
| WO | WO-2007026844 | 3/2007 |

OTHER PUBLICATIONS

U.S. Appl. No. 12/028,300, filed Feb. 8, 2008.
U.S. Appl. No. 12/420,895, filed Apr. 9, 2009.
U.S. Appl. No. 11/271,004, filed Nov. 10, 2005.
U.S. Appl. No. 11/676,798, filed Feb. 20, 2007.
"English Translation of Umicore AG & Co. KG Opposition against EP 2 111 286 B1", Apr. 6, 2011, 12 pages.
"Opposition of Johnson Matthey Public Limited Company against EP 2 111 286 B1", Apr. 6, 2011, 24 pages.
"Opposition of Umicore AG & Co. KG against EP 2 111 286 B1", Apr. 6, 2011, 13 pages.
Heck, Ronald M. et al., "Catalytic Air Pollution Control", *Commercial Technology, Second Edition* 2002, 6 pages.
Meng, B., "Construction materials for supporting components", *Bauverlag, 3rd Edition* 1996, 67-74.
Tao, Tinghong et al., "Diesel SCR NOx Reduction and Performance on Washcoated SCR Catalysts", 2004, 11 pages.
Volk, Raimund, "Rauheitsmessung—Theorie und Praxis", 2005, pp. 12-29.

* cited by examiner

GAS CATALYSTS COMPRISING POROUS WALL HONEYCOMBS

CROSS-REFERENCE TO RELATED APPLICATIONS

This application claims the benefit of priority under 35 U.S.C. §119(e) to U.S. Patent Application No. 60/887,533, filed Jan. 31, 2007, which is hereby incorporated by reference in its entirety.

TECHNICAL FIELD

Embodiments of the present invention relate to catalysts useful for the treatment of gases to reduce the level of contaminants contained therein. In particular, embodiments of the invention pertain to catalysts comprising honeycomb substrates having porous walls and catalytic material deposited within the walls of the substrate.

BACKGROUND ART

Catalytic converters are well known for the removal and/or conversion of the harmful components of exhaust gases. Catalytic converters have a variety of constructions for this purpose. In one form, the converter comprises a rigid skeletal monolithic substrate on which there is a catalytic coating. The monolith substrate has a honeycomb-type structure which has a multiplicity of longitudinal channels, typically in parallel, to provide a catalytically coated body having a high surface area.

The monolithic substrate, and particularly the multiplicity of channels, can be coated with a slurry or washcoat of a catalytic and/or absorbent material, which are typically aqueous solutions containing ceramic particles, for example, alumina, ceria and zirconia particles. The particles may be catalytic without added material, and the particles may have an added catalytic function by dispersing a catalytic component, for example, a precious metal component, on the particles. When the channels of the substrate are open-ended, the carrier is referred to as a "flow through" carrier. When each channel is blocked at one end of the carrier body, with alternate channels blocked at opposite end-faces, the carrier is referred to as a wall-flow carrier (or filter).

The rigid, monolithic substrate can fabricated from ceramics and other materials. Such materials and their construction are described, for example, in U.S. Pat. Nos. 3,331,787 and 3,565,830 each of which is incorporated herein by reference in its entirety. Examples of ceramic materials include cordierite, alumina, silicon carbide, silicon nitride, zirconia, mullite, spodumene, alumina-silica-magnesia or zirconium silicate, and monolithic honeycomb substrates made from ceramic materials are extruded, dried and calcined. Alternatively, the monoliths can be fabricated from corrugated metal foil which is wrapped into a coil to form a honeycomb substrate. Examples of monolithic substrates made from metal foils are disclosed in U.S. Pat. No. 4,119,701 and U.S. Pat. No. 4,455,281. While corrugated honeycombs can be made from metal foils having holes formed or punched through the foil, the metallic foil generally has a low porosity. One limitation of honeycombs made from metal foils is that a catalyst layer cannot be tightly adhered to the metal substrate with a thin oxide layer formed thereon because of its low porosity. As a result, the catalyst layer, which is often a ceramic material applied as a washcoat, readily peels off the metal substrate due to the difference in thermal expansion between the ceramic catalyst layer and the metal substrate. Accordingly, ceramic monolithic honeycombs are generally preferred in the manufacture of catalytic converters for many applications.

There are various known methods of providing a washcoat layer on the wall surfaces of ceramic monolithic honeycomb substrates. The porosity of the walls of most commercially available ceramic substrates is generally less than 35%, and the pores have a mean pore size of less than about 30 microns. In addition, the pores of most commercially available substrates are generally not open, interconnected pores. Due to the pore size and the lack of open pores, washcoating of ceramic honeycomb substrate walls involves forming layers on the walls of the substrate, and the catalyst washcoat is generally on the exterior wall surfaces, as opposed to being disposed within the walls.

U.S. Pat. No. 5,334,570 discusses the issue of the back pressure effect of a catalytic converter on internal combustion engine performance. As is widely known, as back pressure decreases, engine performance generally improves. A decrease in back pressure is associated with an increase in the aggregate open transverse cross sectional area of the flow-through channels or cells of the washcoated, multichannel honeycomb substrate. This open transverse cross-sectional area is referred to in U.S. Pat. No. 5,334,570 as open frontal area or OFA. A phenomenon referred to as filleting, which will be described with respect to FIGS. 1 and 2, prevents decreasing the back pressure associated with the washcoated, multichannel honeycomb substrate.

FIG. 1 shows generally at 10 a monolithic substrate of generally cylindrical shape having a cylindrical outer surface 12, one end face 14 and an opposite end face, not visible in FIG. 1, which is identical to end face 14. The juncture of outer surface 12 with the opposite end face at its peripheral edge portion is indicated at 14' in FIG. 1. Substrate 10 has a plurality of longitudinal fluid flow channels formed therein. Gas flow channels 16 are formed by channel walls 18, shown in FIG. 2. Gas flow channels 18 extend through carrier 10 from end face 14 to the opposite end face thereof, the channels being unobstructed so as to permit the flow of a fluid, e.g., a gas, longitudinally through carrier 10 via channels 16 thereof. As will be seen from FIGS. 1 and 2, channel walls 18 are so dimensioned and configured that gas flow channels 16 have a substantially regular polygonal shape. In FIG. 2, the shape of the channels 16 is shown as being square, except for fillet portions 20 which, in the illustrated embodiment, define in profile arcuate concave sections and comprise the juncture of adjacent ones of walls 18. Fillets 20 are formed by coating adhering to the corners of the channels, which reduces the cross-sectional area of the channel and decreasing the open frontal area of the substrate 10, which leads to an increase in back pressure.

As shown in FIG. 2, the width in cross section of channels 16 is indicated by W, the width in cross section of any side of the geometric square figure S superimposed on the cross sectional view of gas channel 16. Each side of the square figure S defines the nominal width W in cross section of the regular polygon approximated by the cross section profile of gas channel 16. The width W corresponds to the straight line distance extending perpendicularly from the substantially flat planar mid portion of one channel wall 18 to that of an opposite wall 18. The term "nominal width" channel walls is used to have the meaning illustrated herein, i.e., the width in cross section of one side of the polygon defined by the channel cross section profile if the filleted corners are ignored (or are nonexistent, as may be the case when the term is used with reference to structures according to embodiments of the invention). W would correspond to the actual physical width in cross section of the walls 18 if concave portions 20 were eliminated, in which case the cross section profiles would be substantially geometrically perfect squares. The arcuate surface length of fillet portions 20 is geometrically indicated in FIG. 2 by arc A, and the width in cross section of the substantially planar central portion of channel walls 18 is indicated by W'. It should be noted that the concave juncture provided by fillet portions 20 and the adjacent walls 18 could also be provided if fillet portion 20 were flat, i.e., defined in cross section a straight, rather than arcuate profile. Coating 22 of a refractory metal oxide is usually provided as a support for the catalytically promoting material. The deposition of coating 22 is indicated in dot dash lines only on the lower half of gas flow channel 16, for clarity of illustration. It will be appreciated that such coating is normally deposited substantially over the entire surfaces of each of gas channels 16 as will be shown further below.

U.S. Pat. No. 5,334,570 discusses various ways of addressing the fillet problem illustrated above. On one hand, reducing the amount of coating would reduce filleting, however, this would also reduce the amount of catalyst disposed on the channels of the catalytic converter to treat the exhaust gases flowing through the catalytic converter. One previous way to reduce filleting and to provide an adequate amount of washcoat is to form the walls of the monolithic honeycomb substrate with catalyst particles embedded in the walls, as described in U.S. Pat. Nos. 4,637,995, 4,657,880 and 4,888,317. These patents describe articles and process for co-extruding precursors of honeycombs and catalytic supports. This has been referred to as catalyst-in-wall, but as noted in U.S. Pat. No. 5,334,570, this approach has not provided catalytic activity on par with conventional catalytic converters having washcoat deposited on the wall. U.S. Pat. No. 5,334,570 observes that applying washcoats in the pores of the walls of ceramic honeycomb substrates is generally not successful in obtaining a catalytic converter that performs comparably with traditional catalytic converters having washcoat disposed on the walls. One reason for the performance deficiency is that high temperatures are required to sinter the extruded green body to produce the ceramic honeycomb and this invariably causes an irreversible loss of catalytic activity. Other techniques for adding catalytically active material to the process bodies include, for example, decomposing metal salts, as described in U.S. Pat. No. 4,522,940, in the support pores. This is widely used but differs from the traditional washcoat processes because of the use of solutions and because they do not incorporate a solid phase. The pore structure of the support material is typically less than 15 microns, preventing the transport of a solid phase throughout the support. Techniques such as synthesizing a catalytically active material, for example a zeolite, on an existing support as described by Speronello et al in U.S. Pat. No. 4,628,042 and Brown et al. in U.S. Pat. No. 4,157,375 are also undesirable since the entire ceramic honeycomb support must be subjected to the synthesis conditions. This represents a handling problem and significant cost.

A solution proposed in U.S. Pat. No. 5,334,570 is to deposit colloidal particles in the pores of the ceramic honeycomb walls. Colloidal particles are defined as particles having a size in the range of 0.001 to 0.2 microns, more particularly 0.001 to 0.1 microns, and even more specifically, in the range of 0.001 to 0.05 microns.

It is not believed that catalytic converters made in accordance with the teachings of U.S. Pat. No. 5,334,570 have been commercially successful. A possible shortcoming of using colloidal particles as defined in U.S. Pat. No. 5,334,570 is that obtaining and processing colloidal particles is not only expensive, but it is difficult to provide washcoat slurries with sufficiently high solids content to provide a catalytic converter with acceptable catalytic activity. In addition, it is difficult to obtain zeolites in colloidal form, which are typically larger in size than the size range discussed in U.S. Pat. No. 5,334,570.

Another approach is to make the honeycomb out of a catalytic material. A large catalyst "loading" could be achieved without altering the shape of the honeycomb channels. In fact, a large volume of SCR catalysts are made this way. The homogeneous product is effective because the catalyst is relatively low cost and relatively low cost extrusion technology can be used. The low extrusion costs arise because the homogenous product is seldom produced, in large commercial volumes, with cell densities greater than 100 cpsi. For applications to stationary power plants, mechanical strength is not a great concern since the honeycombs are packed into steel "cribs" that are designed to carry the mechanical loads of the surrounding catalysts. Thermal stresses are not a great concern since these large power plants heat up and cool down slowly. The very large mass of catalyst and its stationary nature, minimize stresses resulting from vibration.

Cell densities greater than 300 cpsi are possible and have been produced, but the relatively low strength of the extruded catalyst makes extruding thin walled honeycombs very difficult. In order to take advantage of the higher cell densities, the ability to create thinner walls is required. Recently, the extruded product has been successfully applied to on road truck applications at cell densities competitive with a coated product. The mechanical strength of these honeycombs is significantly poorer than the coated product requiring compromises such as limitations in frontal area of individual blocks and special packaging requirements to accommodate the lower strength product.

The limitation is not so much the technology to create thinner walls, but instead creating thinner walls with sufficient strength to prevent structural collapse of the honeycomb. One common way to improve honeycomb strength is through the use of ceramic fibers. These fibers do not form an inter-connected three dimensional network and do not by themselves constitute a free standing structure. As cell density increases, it becomes more difficult to force the fibers through the smaller die openings. Thus, the ability to produce thin walls and the lack of an interconnected skeletal network limit this technology. Other techniques such as the addition of inorganic binders can be effective but their presence can lead to changes in the porosity of the honeycomb. Generally, as inorganic binders as added to the extrusion mix the strength of the green body increases but the porosity and pore interconnectivity is decreased. Thus, in order to achieve the honeycomb strength, a trade-off is made that reduces the effectiveness of the catalyst.

It is a continuing goal to develop a catalyst composite having sufficient washcoat loading and catalytic activity to treat exhaust gases. It would be desirable to provide catalyst composites with washcoat material disposed predominantly in the wall of the substrate, and if desired, to achieve loadings of up to 7.0 g/in$^3$ without substantially increasing back pressure.

SUMMARY

One embodiment of the invention pertains to a gas treatment article comprising a flow through substrate comprising an inlet axial end, an outlet axial end, wall elements having a length extending between the inlet axial end to the outlet axial end and a plurality of axially enclosed, open-ended channels defined by the wall elements. The wall elements have a porosity of at least 50% and an average pore size of at least 5 microns and less than about 100 microns. The surface of the walls having an average roughness defined by open pores on the surface of the walls. A composite catalyst in the form of a washcoat containing particles having an average particle size greater than about 3 microns is deposited substantially within the wall elements, wherein the average roughness of the surface of the wall elements remains substantially unchanged from prior to loading of the catalyst within the walls.

In one or more embodiments, a substantial portion of pores are interconnected and extend through the wall elements and the washcoat is located substantially within the interconnected pores. In one or more embodiments, the pores have a mean pore size greater than about 20 microns and the porosity of the walls being up to about 70%. In other embodiments, the pores have a mean pore size greater than about 30 microns and the porosity of the walls being up to about 70%.

According to certain embodiments, at a washcoat loading of up to about 2.0 g/in$^3$, the channels are substantially free of fillets. In other embodiments, at a washcoat loading of up to about 2.5 g/in$^3$, the channels exhibit a loss in cross-sectional area after coating compared to an uncoated channel of less than about 20%. In still other embodiments, at a washcoat loading of up to about 7.0 g/in$^3$, the channels have substantially greater cross-sectional area compared to a washcoat channel having the same loading in a honeycomb substrate having a porosity of less than about 35%.

In one or more embodiments, at least about 75% of the washcoat is located within the inside of the wall elements. In other embodiments, at least about 90% of the washcoat is located within the inside of the wall elements.

In certain embodiments, the particle size of the particles in the washcoat is in the range of about 5 and 10 microns. In one or more embodiments, adhesion of the washcoat to the substrate is substantially improved when compared to a substrate having porosity less than about 35%.

In one or more embodiments, the washcoat contains one or more catalysts for the abatement of NOx in an exhaust gas stream. According to an embodiment, the catalyst contains one or more of a zeolite and a non-zeolitic aluminosilicate having the CHA structure.

In other embodiments, the article is a NOx storage and release (NSR) catalytic converter. In still other embodiments, the article is a selective catalytic reduction (SCR) catalyst. According to certain embodiments, the catalyst contains one or more of a natural zeolite, a synthetic zeolite, faujasite, chabazite, clinoptilolite, mordenite, silicalite, zeolite X, zeolite Y, ultrastable zeolite Y, ZSM zeolite, offretite, beta zeolite USY zeolite, ZSM-20 zeolite, zeolites having the CHA structure, chabazite and SAPO materials. In other embodiments, the catalyst contains $V_2O_5$. In still other embodiments, the article contains a catalytic material for the oxidation of CO and HC. In other embodiments, the catalyst material comprises a precious metal component on metal oxide(s) support particles.

Another embodiment of the invention pertains to a gas treatment article comprising a flow through substrate comprising an inlet axial end, an outlet axial end, wall elements having a length extending between the inlet axial end to the outlet axial end and a plurality of axially enclosed, open-ended channels defined by the wall elements having an axial surface and a wall interior, the channels defining a cross-section having an uncoated channel area, the walls having a porosity of at least 50% and an average pore size of at least 5 microns and less than about 100. A composite catalyst in the form of a washcoat containing particles having an average particle size greater than about 5 microns and less than about 15 microns deposited at a loading of up to 2.0 g/in$^3$ is located substantially in the wall interior such that the loss in channel area upon coating with the washcoat is less than about 20% of the uncoated channel area. In one embodiment, the loss in channel area upon coating with the washcoat is less than about 10% of the uncoated channel area.

Another aspect of the invention pertains to a method of treating gas streams containing pollutants with an article as described herein. Another aspect pertains to a method of forming a catalytic article comprising providing a flow through substrate comprising an inlet axial end, an outlet axial end, wall elements having a length extending between the inlet axial end to the outlet axial end and a plurality of axially enclosed, open-ended channels defined by the wall elements having an axial surface and a wall interior, the channels defining a cross-section having an uncoated channel area, the walls having a porosity of at least 50% and an average pore size of at least 5 microns and less than about 100; and immersing the substrate in a composite catalyst in the form of a slurry containing particles having an average particle size greater than about 5 microns and less than about 15 microns so that the slurry forms a washcoat deposited at a loading of up to 2.0 g/in$^3$ substantially in the wall interior such that the loss in channel area upon coating with the washcoat is less than about 20% of the uncoated channel area. According to one embodiment of the method, the loss in channel area upon forming the washcoat is less than about 10% of the uncoated channel.

DETAILED DESCRIPTION

Figure 1:
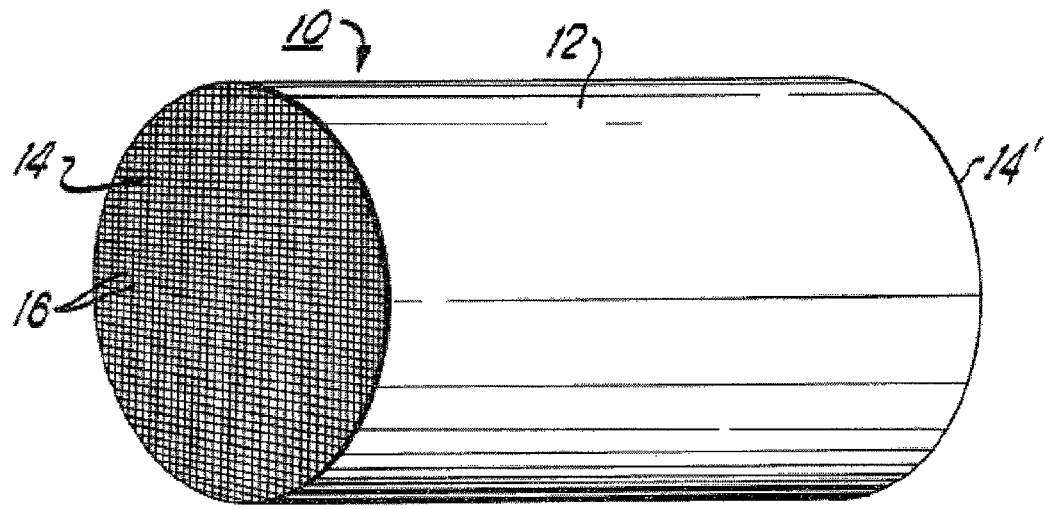
FIG. 1 is a perspective view of a monolithic honeycomb ceramic substrate.

Before describing several exemplary embodiments of the invention, it is to be understood that the invention is not limited to the details of construction or process steps set forth in the following description. The invention is capable of other embodiments and of being practiced or being carried out in various ways.

One or more embodiments of the present invention relate to a catalyst composite comprising catalytic material deposited within the porous walls of a honeycomb substrate, in particular a flow through honeycomb substrate. The catalyst composites provided in accordance with embodiments of the invention are useful in treating exhaust gas from engines, for example, automobile engines. The catalyst composites can be used as oxidation and reduction catalysts, for example SCR catalysts.

In a specific embodiment, an improved catalyst/substrate for the removal of NOx via selective catalytic reduction using ammonia is provided. The improvement comprises an SCR catalyst coated on a high porosity ceramic honeycomb flow through support. According to one or more embodiments, the support has the following properties: a large fraction of interconnected pores; the porosity of wall material is greater than about 50% and up to about 70% porosity; a mean pore size greater than 20 microns, for example, greater than 25 microns, more specifically greater than about 30 microns, and more particularly greater than about 40 microns but less than about 100 microns; and a broad pore size distribution.

While a specific embodiment pertains to an SCR catalyst, other catalysts are within the scope of the invention, for example, oxidation catalysts and also perhaps catalyst to remove NOx by the absorption and periodic reduction. This would also include materials designed for physical absorption of hydrocarbons and NOx.

In accordance with embodiments of the present invention, an exhaust gas treatment system or article is provided containing a catalytic member or catalytic converter comprising a substrate comprised of channels bounded by longitudinally extending axial walls which has washcoat layers deposited within the walls of the catalytic member, each containing one or more catalysts for the abatement of pollutants.

Catalysts for the selective reduction of NOx using ammonia are well known and used commercially in many forms. SCR catalyst are used in such forms as homogenous extruded honeycombs, coated ceramic honeycombs, coated metal mesh and incorporated into ceramic papers. The many forms of usage arise from the application of SCR catalysts to many different industries and the extensive optimization to specific applications. SCR catalyst have also been prepared as particulate or coated on support media for pack beds applications.

SCR catalysts are being used in a relatively new application, the control of NOx from on road, internal combustion engines. The application of SCR catalysts to internal combustion engines has presented a new set of operating conditions that must be optimized for best utilization of the technology. When applied to on road vehicles powered by internal combustion engines, the SCR catalyst must provide very high NOx removal, long life and resist mechanical stress resulting from vibration and thermal gradients.

Catalysts operate in two regimes, mass transfer limitation and kinetic limitation. Crudely, when operating under mass transfer control, the overall activity of the catalyst/support depends on how fast reactants can be transferred to the catalyst surface. Higher conversion is achieved by reducing the resistance to the transfer of reactant to the catalyst surface. The chemical reaction occurs immediately on contact with the catalyst surface. Reducing the resistance to mass transfer generally involves making the diffusion distance as small as possible. In honeycombs, this is achieved by using high cell densities or large volumes of catalyst. In packed beds, mass transfer limitations are reduced by using large bed volumes or by using smaller particles.

At the other extreme, catalysts can operate under what is referred to as kinetic control. In this case, the reaction rates are slow enough that the overall reaction is not limited by how fast the reactants can reach the catalyst. The overall reaction rate is controlled by the rate of the chemical reaction on the catalyst surface. Under these conditions, reactants can diffuse throughout the entire volume of the catalyst. The chemical reaction rate, and hence the overall reaction rate become dependent on the volume of catalyst in the system.

For a given catalyst and catalyst volume, temperature plays the greatest role in determining whether the catalyst is operating under mass transfer or kinetic control. Temperature is important because the chemical reaction rate increases exponentially with temperature. Therefore, lower temperatures favor kinetic control, while mass transfer effects are typically found at higher temperatures. Most SCR catalysts operate under a combination of kinetic and mass transfer control. At low temperature, where reaction kinetics are slower, SCR catalysts are under kinetic control, while at higher temperatures, mass transfer can become important. On road diesel engines can operate over a very wide temperature range, hence an SCR catalyst that must remove NOx over the entire operating range of the engine will be under both kinetic and mass transfer control depending on engine conditions. It would be desirable to provide an SCR catalyst that effectively operated over this wide range of conditions.

Superimposed on these requirements for optimum chemical activity are characteristics specific to the application. For example, these might include, attrition resistance in high dust environments, mechanical strength to withstand forces resulting from vibration, resistance to chemical poisons and stability to high temperature excursions. Balancing optimization for chemical activity with application specific requirements is necessary to achieve the best product.

According to one or more embodiments of the invention, using a light, strong honeycomb support whose wall structure consists of an open interconnected, three-dimensional skeletal framework permits a high catalyst loading to be achieved in the support. This open, skeletal framework allows for the diffusion of chemical reactants and products throughout the honeycomb wall thickness. As discussed above, an example of an application of the technology is for improved SCR catalysts. Other applications are also possible, which use precious metal (PM) catalysts. In these catalysts, one way to maintain a high precious metal dispersion is to lower the precious metal concentration on the support while increasing the total amount of support. Thus, the precious metal (PM) concentration per volume of coated product remains the same, but the concentration per volume of the support or per unit area of support decreases. The PM or other suitable active component can be applied as a post dip or be incorporated into the slurry.

Current ceramic honeycombs such as those manufactured by Corning and NGK can obtain cell densities greater than 1000 cpsi. Cell density in this regard refers to the number of channels per unit area. To minimize pressure drop, wall thickness can be very thin, less than 0.003 inches. In general, as the cell density decreases, i.e., the cell size becomes larger, the wall thickness increases.

Typically honeycomb walls have porosity ranging from 30 to 45%. Only a small fraction of these pores are interconnected and very few pores are interconnected to the main channel or surface of the wall elements. Consequently, much of the wall porosity is inaccessible to the catalyst coating and limits the amount of catalyst that can be incorporated into the honeycomb walls.

When coated with a catalyst, the catalyst particles collect on the surface of the wall. A relatively small fraction of the available catalyst resides in the pores. The amount of catalyst that can be coated on a honeycomb wall is limited by the coating thickness. A thick coating leads to channel restrictions and hence higher pressure losses in service. A thick coating can also lead to catalyst adhesion problems.

In the extreme case, a high catalyst loading alters the geometric surface area of the honeycomb channel. The loss of geometric surface area occurs if the catalyst loading changes the channel geometry from square to round. This occurs when the catalyst coating initially fills the honeycomb corners, altering the cross section from square to round. By doing so, this reduces the geometric surface area of the honeycomb by 21%. At this level of reduction, a 400 cpsi honeycomb, with round channels, would have less geometric surface area less than a 300 cpsi honeycomb with square channels. Thus, much of the advantages of using a high cell density is lost.

Embodiments of the invention avoid this problem by adjusting the wall thickness and porosity to achieve the desired high catalyst loading without altering the shape the honeycomb channels. The catalyst first fills the wall porosity, and then collects on the honeycomb walls and corners. In effect, the porous wall acts to direct the catalyst slurry into the honeycomb walls. With a higher wall porosity than in conventional ceramic honeycomb substrates, a much larger catalyst loading can be loaded into the wall. The high degree of inter-connectivity means that a significantly larger portion of the catalyst is available for chemical reaction with gases flowing through the channels of the honeycomb substrate.

According to embodiments of the invention, a high catalyst loading is achieved without altering the geometry of the honeycomb channel. This provides the low temperature benefits of high catalyst loading without compromising the geometric surface area for the temperature regime in which the reaction is mass transfer controlled.

The ability to put a large fraction of the total catalyst loading in to the walls reduces the risk for catalyst loss, either due an excessively thick coating or via erosion by the process streams. The honeycomb provides an open three dimensional skeletal structure that is resistant to particulate erosion. This represents an improvement over catalysts prepared as homogenous honeycombs, since the leading edge of the honeycomb is eroded by high velocity ash particles. The proposed invention also then provides an advantage in dirty streams such as those from coal fired power plants. In this regard, the prevention of catalyst loss resulting from ash erosion, the invention is not limited SCR catalyst but could be applicable to any catalyst operating in high dust environment.

In applications that use the honeycomb as wall flow filters by blocking alternative channels, the pressure drop is lowered by increasing the wall porosity. However, to maintain filtration efficiency, the average pore size must be typically less than 20 microns with a narrow pore size distribution. The presence of large pores either as result of a broad pore size distribution or a large average pore size must be avoided since flow preferentially occurs through these larger pores leading to lower filtration efficiency. Therefore, the optimum combination of porosity, pore size and interconnectivity is different for filter applications than it is for flow through applications.

Embodiments of the invention propose a much broader pore size distribution than previously disclosed in the literature. The broader pore size distribution arises from a new way of viewing catalyst-support interaction. Prior technology described the catalyst as being coated onto the support. The analogy to painting is a useful way to describe the technology and the resulting catalyst structure on the support. By implementing embodiments of the invention, the concept of coating is rejected and instead is replaced with an interpenetrating network of catalyst and support. In embodiments of the invention, both the catalyst and support form interconnected three dimensional networks. The substrate serves to provide the frame work and the necessary strength. The mean pore size and pore size distribution are intentionally broadened to facilitate catalyst penetration well into the wall structure and during service to facilitate the mass transfer of reactants and products to all area of the catalyst. According to one or more embodiments, pores larger than 30 microns but less than 250 microns facilitate this mass transfer.

According to one or more embodiments, the carrier comprises a ceramic honeycomb structure. A suitable carrier is a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls. Contrary to conventional catalytic converters in which catalytic material is coated as a "washcoat" on the wall surfaces so that the gases flowing through the passages contact the catalytic material, according to embodiments of the present invention, a large proportion of the coating is deposited inside the porous walls of the honeycomb substrate. Such structures may contain from about 60 to about 1200 or more gas inlet openings (i.e., "cells") per square inch of cross section.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α alumina, aluminosilicates and the like.

Washcoats

As is known in the art, catalytic components typically comprise precious metals such as platinum, palladium, rhodium, and/or ruthenium deposited on a support. A suitable support is a high surface area refractory metal oxide. In a specific embodiment, the loading of the washcoat upon the walls of the substrate the carrier is between about 1.4 g/in$^3$ and 7.0 g/in$^3$, and more particularly, in the range of about 2.0 g/in$^3$ to about 7.0 g/in$^3$. Examples of high surface refractory metal oxides include, but are not limited to, a high surface area refractory metal oxide such as alumina, silica, titania and zirconia and mixtures thereof. The refractory metal oxide may consist of or contain a mixed oxide such as silica-alumina, aluminosilicates which may be amorphous or crystalline, alumina-zirconia, alumina-chromia, alumna-ceria and the like. An exemplary refractory metal oxide comprises gamma alumina having a specific surface area of about 50 to about 300 m$^2$/g and which is present in a loading of about 2.0 to about 7.0 g/in$^3$.

The washcoat may further include one or more stabilizers/promoters. Suitable stabilizers include one or more non-reducible metal oxides wherein the metal is selected from the group consisting of barium, calcium, magnesium, strontium, and mixtures thereof. In one or more embodiments, the stabilizer comprises one or more oxides of barium and/or strontium. Suitable promoters include one or more non-reducible oxides, or rare earth metals selected from the group consisting of lanthanum, neodymium, praseodymium, yttrium, zirconium samarium, gadollium, dysprosium, ytterbium, niobium, and mixtures thereof.

The washcoat may also include oxygen storage components such as ceria containing ceria/zirconia composite with ceria ranged from about 3% to 100% as weight percent, for example, 5% to 55% of ceria in the composite.

Figure 3A:
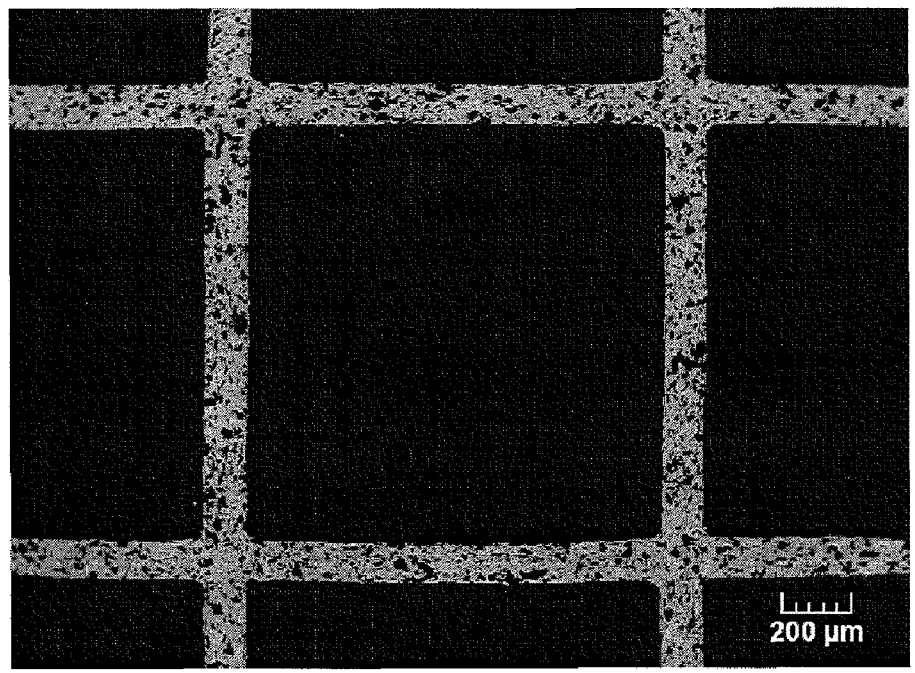
FIGS. 3A and 3B are images taken from polished cross sections of 400 cell per square inch (cpsi) 4 mil cordierite ceramic honeycombs according to the prior art.
Figure 3B:
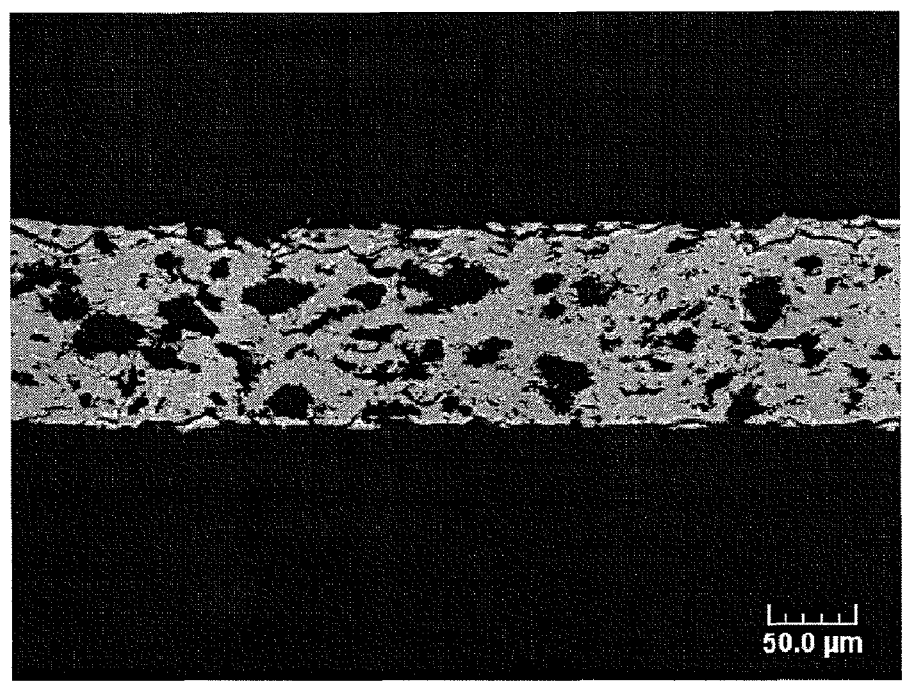

The catalytic members according to one or more embodiments of the invention may be more readily appreciated by reference to the Figures, which are merely exemplary in nature and in no way intended to limit the invention or its application or uses. Referring in particular to FIGS. 3A and 3B are images taken from polished cross sections of 400 cell per square inch (cpsi) 4 mil cordierite ceramic honeycombs according to the prior art. The wall porosity is about 35%. In these photographs, porosity within the honeycomb wall appears as dark regions. The cordierite ceramic is the light regions. Note while the wall has significant porosity, much of these pores do not communicate with gas channel. This means that gases cannot readily diffuse from the honeycomb channel to the honeycomb interior.

Figure 4A:
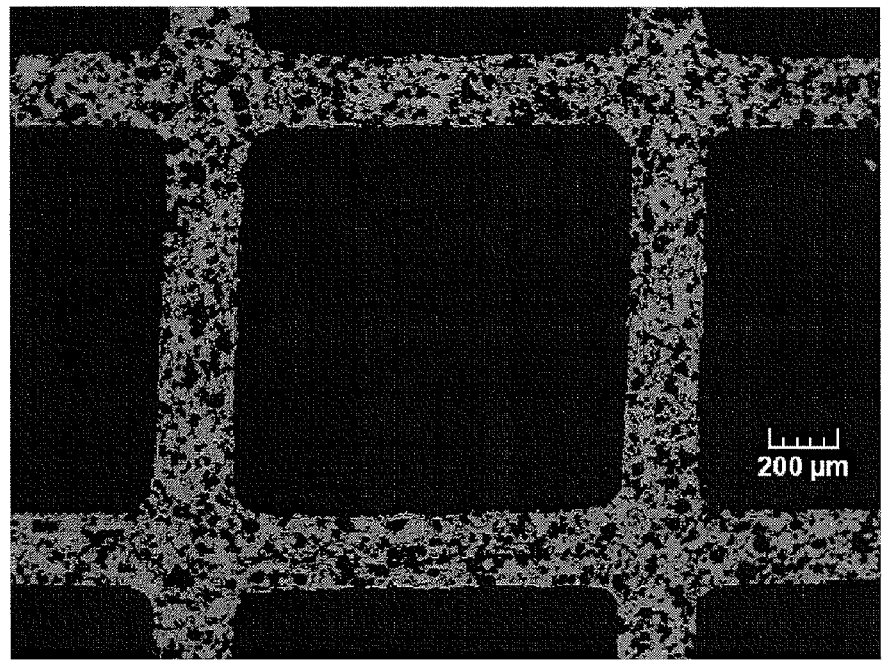
FIGS. 4A and 4B are from a 360 cpsi 8 mil ceramic honeycomb with a wall porosity of about 56%.
Figure 4B:
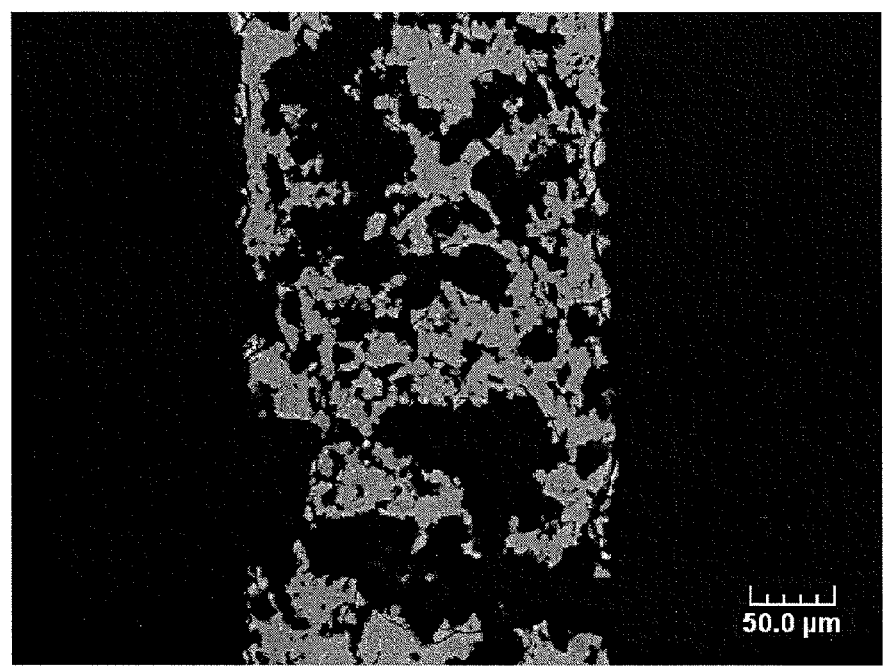

In contrast, FIGS. 4A and 4B are from a 360 cpsi 8 mil ceramic honeycomb with a wall porosity of about 56%. It is obvious from a comparison to FIGS. 3A and 3B with FIGS. 4A and 4B, that wall thickness is greater and wall porosity is higher. Note also that most of porosity in FIGS. 4A and 4B is interconnected, allowing fluids to readily transport within the honeycomb wall.

Preparation of the Catalyst Composite

The catalyst composite of the present invention may be readily prepared by processes well known in the prior art. A representative process is set forth below.

For the washcoat, finely divided particles of a high surface area refractory metal oxide such as gamma alumina are slurried in an appropriate vehicle, e.g., water. The carrier may then be dipped one or more times in such slurry or the slurry may be deposited in the carrier walls such that there will be deposited on the carrier the desired loading of the metal oxide, e.g., about 2.0 to about 7.0 g/in$^3$. To incorporate components such as palladium or palladium and platinum, stabilizers and/or promoters, such components may be incorporated in the slurry as a mixture of water soluble or water-dispersible compounds or complexes. Thereafter, the honeycomb carrier having washcoat loaded in the walls is calcined by heating, e.g., at 500-600° C. for about 1 to about 3 hours. Typically, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental considerations, aqueous solutions of soluble compounds or complexes of the platinum-group metals are utilized. For example, suitable compounds are palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A suitable method of preparing a washcoat for a catalyst composite according to embodiments of the invention is to prepare a mixture of a solution of precious metal compound compounds and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of about 2 to less than about 7. The pH of the slurry may be lowered by the addition of a minor amount of an inorganic or organic acid such as hydrochloric or nitric acid, or organic acid such as a carboxylic acid such as acetic acid, tartaric acid, succinic acid or oxalic acid to the slurry. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 5-15 microns, in an average diameter. The comminution may be accomplished in a ball mill or other similar equipment, and the solids content of the slurry may be, e.g., about 20-60 wt. %, more particularly about 35-45 wt. %.

SCR Compositions

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. These zeolites have a pore size large enough to permit adequate movement of the reactant molecules NO and $NH_3$ in to the pore system and the product molecules $N_2$ and $H_2O$ out of the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other zeolites may also satisfy the aforementioned criteria, for example, zeolites having the CHA structure such as chabazite. Additionally, non-zeolitic aluminosilicates having the CHA structure such as SAPO materials may also be used according to embodiments of the invention.

Non zeolite containing SCR catalysts are also well known and widely used. Typical compositions are described in U.S. Pat. Nos. 4,010,238 and 4,085,193, the entire contents of these patents incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

The upper use temperature of these $TiO_2$ catalysts is typically not as high as the zeolite based catalysts, but for applications in which the SCR catalyst is not exposed to soot filter regeneration temperatures (e.g., exceeding about 600° C.), the $TiO_2$ based catalyst offers an excellent combination of high performance, resistance to sulfur poisoning and resistance to other chemical poisons.

In addition, precious metal-containing catalysts have been proposed as SCR catalysts, for example, as described in U.S. Pat. No. 2,975,025 and U.S. Pat. No. 3,328,115.

The following non-limiting examples shall serve to illustrate various embodiments of the present invention.

Example 1 and Comparative Example #2

A slurry of an iron exchanged zeolite was prepared by adding approximately 1 kg of zeolite filter cake to 215 g of DI water to form a 44.8% solids slurry. After briefly milling in a continuous mill, 90% of the particles had a diameter less than 8.2 microns as determined by laser diffraction. A zirconia binder was added at a loading of 5% $ZrO_2$ and slurry solids adjusted to 43.2%.

Ceramic cores approximately 1 inch in diameter×5 inches long were cut from larger honeycombs. All samples had a nominal cell density of 300 cells per square inch. The high porosity honeycombs described in example 1 had a wall thickness of 0.012 inches, while the standard reference honeycomb of comparative example 2 had a wall thickness of 0.008 inches.

Multiple cores for each wall porosity were coated by dipping the core into the slurry and then removing the excess slurry with compressed air. These cores were dried and then calcined at 450° C. for 1 hour. The amount of catalyst picked up during coating was calculated from the increased honeycomb weight after calcining and is expressed as grams per cubic inch of honeycomb. After one coat, the washcoat loading on the high porosity substrates of example 1 was 1.84 $g/in^3$, while the standard porosity honeycomb of comparative example 2 was 1.39 $g/in^3$.

A portion of the coated honeycomb was cut, cast into an epoxy resin, and polished. The polished section was examined in a scanning electron microscope to determine the distribution of the catalyst within the honeycomb.

A separate set of samples were evaluated to determine the how well the catalyst adheres to the ceramic honeycomb. The ability of a catalyst formulation to remain on the honeycomb during service is a useful property to evaluate the success of the catalyst. The coated catalyst was dipped into a water bath with ultra sonic agitation. The ultra sonic energy acted to promote spalling of the coated catalyst from the ceramic honeycomb.

Weighing the part before and after this treatment gave an indication of how well the catalyst adhered to the honeycomb. Typically, weight losses of less than 2%, based on just the weight of the coated catalyst, are acceptable. A higher weight loss requires reformulation of the catalyst with potential losses in activity from a higher binder loading.

Results of this test showed that the above catalyst coated on the higher porosity substrates of example 1 showed washcoat losses of less than 1%, while the same catalyst coated on the standard reference honeycomb of comparative example 2 showed 6% washcoat loss.

Figure 5:
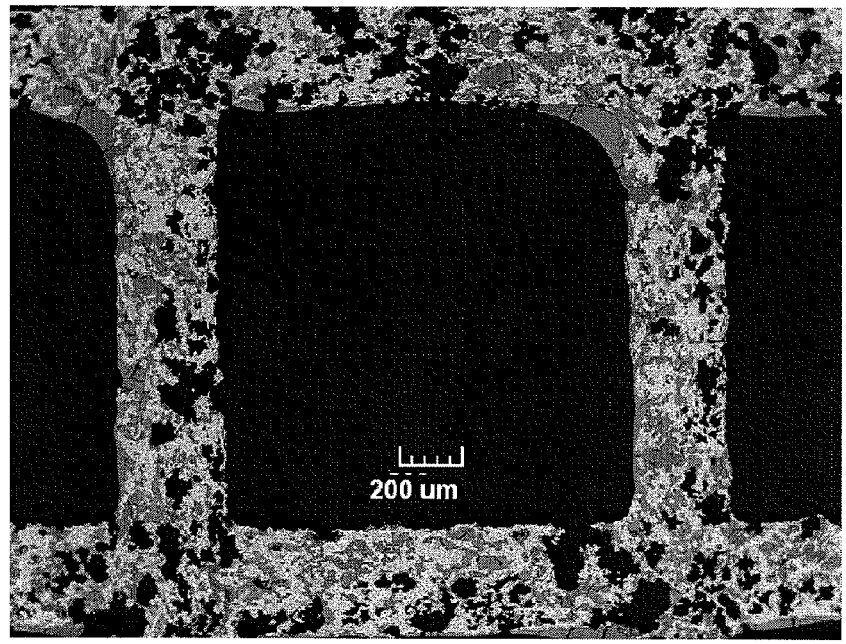
FIGS. 5-7 show scanning electron microscope photographs of porous walled honeycomb substrates prepared in accordance with Example 1.
Figure 6:
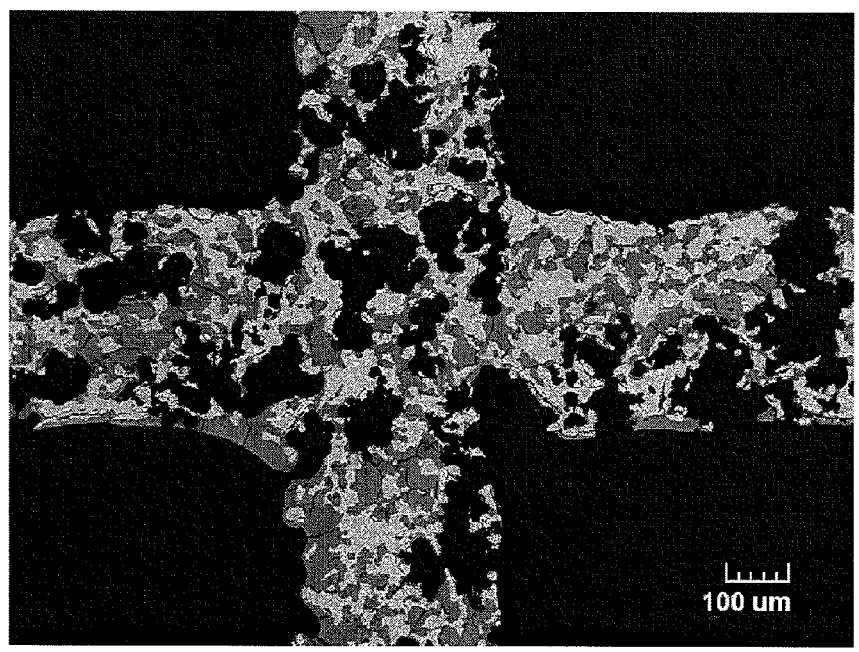
Figure 7:
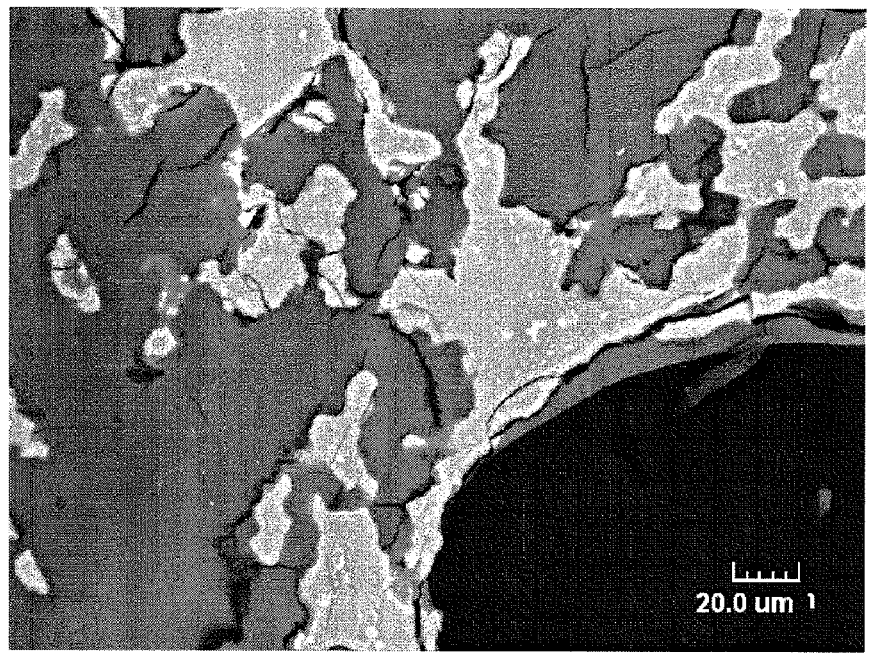

FIGS. 5-7 show scanning electron microscope photographs of porous walled honeycomb substrates prepared in accordance with Example 1. FIG. 5 is a 50× magnification showing very little washcoat on the surfaces of the channel of the honeycomb, and very little filleting of the type shown in FIG. 2, except for a small fillet in the upper right hand corner of the channel. The coating, shown in the darker gray shading is distributed throughout the wall of the honeycomb. FIG. 6 is a 100× magnification showing the intersection of four channels, and again, filleting is essentially nonexistent, and the coating is shown as evenly distributed in the walls of the honeycomb. FIG. 7 is a 500× magnification of a section of a honeycomb wall showing the heavy distribution of washcoat within the honeycomb wall.

Figure 8:
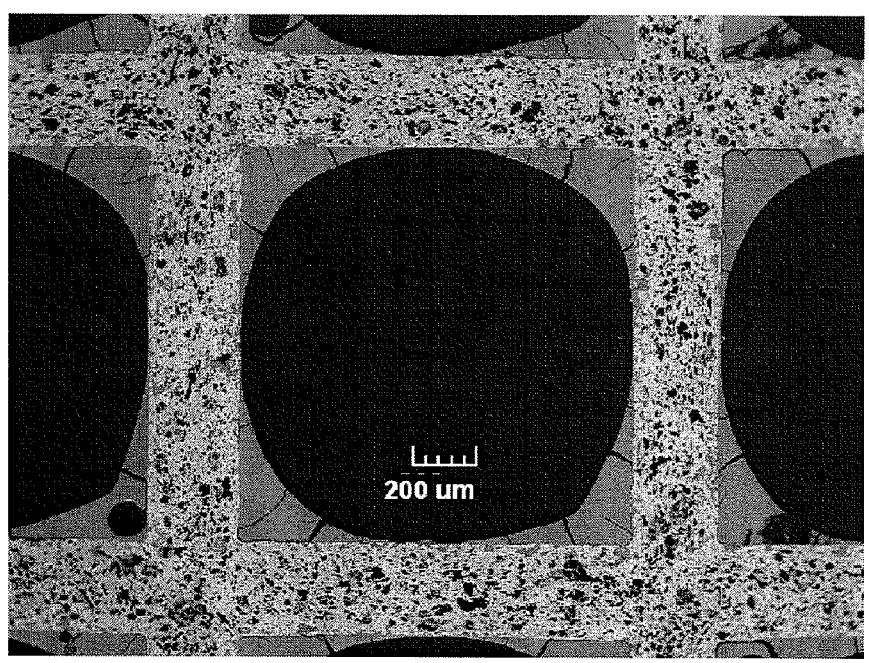
FIGS. 8-9 show scanning electron microscope photographs of conventional honeycomb substrates prepared in accordance with comparative example 2.
Figure 9:
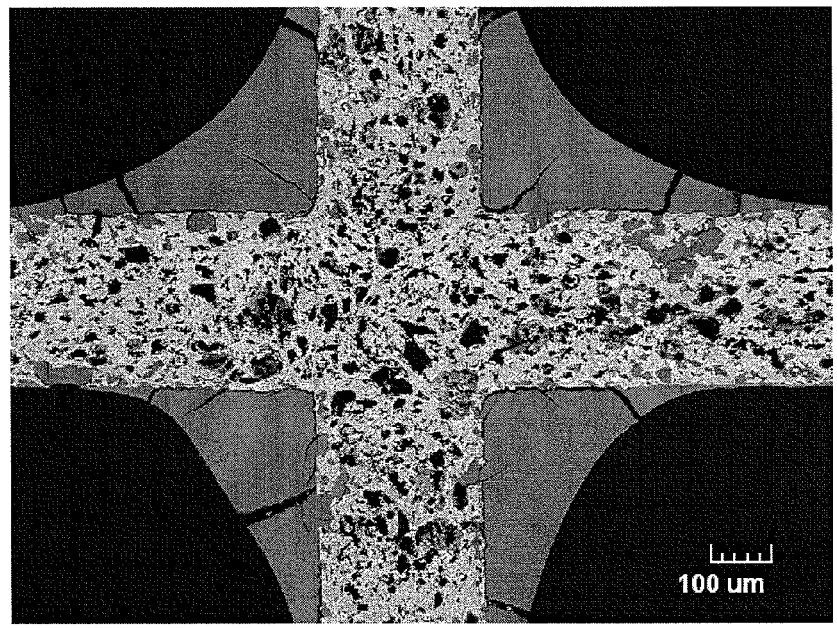

FIGS. 8-9 show scanning electron microscope photographs of conventional honeycomb substrates prepared in accordance with comparative example 2. FIG. 8 shows a 50× magnification of a single channel and surrounding channels. Similar to the view shown in FIG. 2, each corner contains a large fillet, and the coating is occluding a substantial portion of the geometrically square channel to the extent that upon coating the fillets cause the coated channel to have a substantially round cross section. FIG. 9 is a 100× magnification showing the intersection of 4 channels, and again, each corner of the four channels shown contains a substantial fillet. In addition, little coating is shown as being distributed within the wall of the honeycomb.

A study of the microphotographs reveals that the catalysts prepared in accordance with embodiments of the present invention exhibit washcoat loading substantially inside the wall of the substrate, with little or no coating on the exterior wall surfaces. Minor fillets were observed in some samples, but the coated porous substrates were generally free of fillets.

Figure 2:
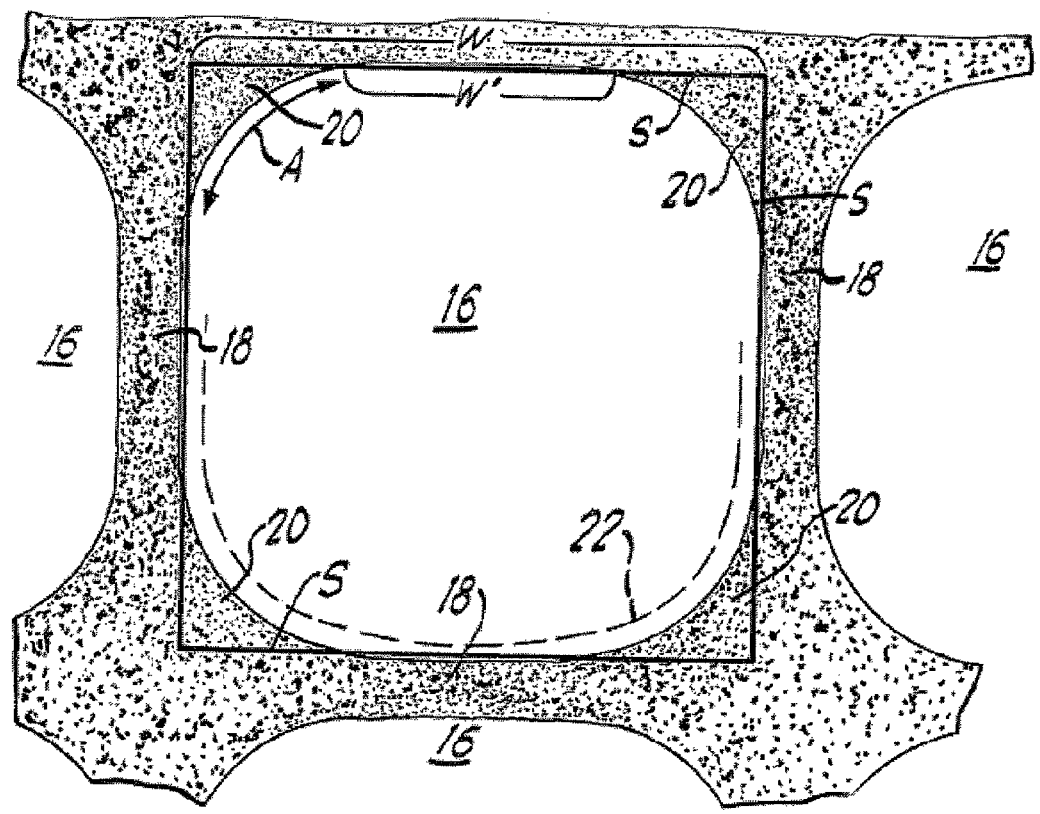
FIG. 2 is an enlarged end view of a channel of a honeycomb ceramic substrate having a catalytic coating deposited on the channel walls in accordance with the prior art.

On the other hand, FIGS. 8-9 show that the coating covers the exterior wall surface with substantial fillets, similar to the structure depicted in FIG. 2.

Effects of catalyst coating on the channel dimensions could be readily followed by the measured channel diagonal. Catalyst that collects in the corners reduces the channel opening when measured across the channel diagonal. As can be readily seen from the Figures, for the coated standard wall honeycombs the ratio of the channel diagonal with and without the catalysts coating was about 75%. Note that a measurement of the channel dimensions made along the midpoint of the channel cross section would have showed no reduction in the channel dimension as a result of the coating.

Examination of FIG. 5 to 7 also demonstrate how that high porosity substrates can act to direct catalyst over the entire geometric area of the honeycomb channel. Consider FIG. 8, a photomicrograph of a coated standard porosity honeycomb. Near the midpoint, there is a very small amount of catalyst in the honeycomb wall and almost no catalyst on the wall. Moving closer the adjacent channel, the amount of the catalyst increases the fillet effect. This variation in catalyst loading with position can affect the overall catalytic activity of the catalytic converter. Away from the corners, a loss of catalytic activity (expressed as rate per unit mass) has a greater effect than the same loss of activity in the corners since the amount of initial material is much larger in the corners. Thus, a significant portion of the geometric honeycomb area is lost leading to a lower catalytic activity per unit volume of the honeycomb. To compensate, the catalyst loading must be further increased or the overall coated honeycomb volume increased. Both of these add cost to the final system and are therefore undesirable.

Thus, a ceramic honeycomb extruded ceramic substrate with inter-connected pores of the type shown in FIGS. 5-7 results in the washcoat being disposed predominantly in the walls of the substrate. According to certain embodiments, greater than about 75% of the washcoat is disposed within the walls, and as can be seen from FIGS. 5-7, greater than about 80%, for example, greater than about 90%, and greater than about 95-99% of the washcoat is within the walls of the substrate. It is expected that when the catalyst fills the walls of the substrate, about 1 to about 1.4 $g/in^3$ of coating can be disposed within the walls of the substrate. Due to the porous nature of the walls, it is expected that catalyst loadings greater than 2.5 $g/in^3$, for example greater than 3.0, 4.0, 5.0 and up to about 7 $g/in^3$ can be obtained by loading the walls and coating the surfaces of the walls. Generally, very little or substantially no cracks or delamination was observed for samples prepared in accordance with embodiments of the invention as shown in FIGS. 5-7. The substrates according to embodiments of the invention have an average pore size of 30 to 100 microns. Washcoats having an average particle size greater than about 5 microns and typically between 5 and 10 microns fills the pores of the porous samples, but coated the walls of the conventional samples shown in FIGS. 8-9.

The samples prepared in accordance with embodiments the present invention demonstrated substantially no loss in geometric area of the channels of the honeycomb. According to embodiments of the invention, the loss in channel area is less than about 20%, for example, less than about 10%, specifically less than about 5%, and more specifically less than about 1% of the geometric area of the channel. On the other hand, the samples shown in FIGS. 8-9 showed a loss of about 21% of geometric area due to fillets and coating of the walls.

Additionally, the microphotographs show that for the samples prepared in accordance with embodiments of the present invention (FIGS. 5-7), the average roughness of the wall surfaces was substantially unchanged after loading the walls with washcoat. On the other hand, the samples shown in FIGS. 8-9 were coated, substantially changing the average roughness of the wall surfaces.

The ability to achieve high washcoat loading and relationship between catalyst loading and catalyst performance is demonstrated in the following 3 examples.

In comparative examples 3 and 4, the same Fe zeolite as in examples 1 and 2 was washcoated onto a 400 cells per square inch honeycomb with a wall thickness of 0.006 inches and a wall porosity of 35%. This honeycomb is typical of current technology. In comparative example 3, a catalyst loading of 2.5 $g/in^3$ was achieved, and in comparative example 4, a catalyst loading of 3.0 $g/in^3$ was achieved. Attempts to coat higher loadings were unsuccessful due to channel blockage during coating. In example 5 a 360 cells per square inch honeycomb with a wall porosity of greater than 50% was readily coated at a washcoat loading of 4.0 $g/in^3$ without channel blockage.

Figure 10:
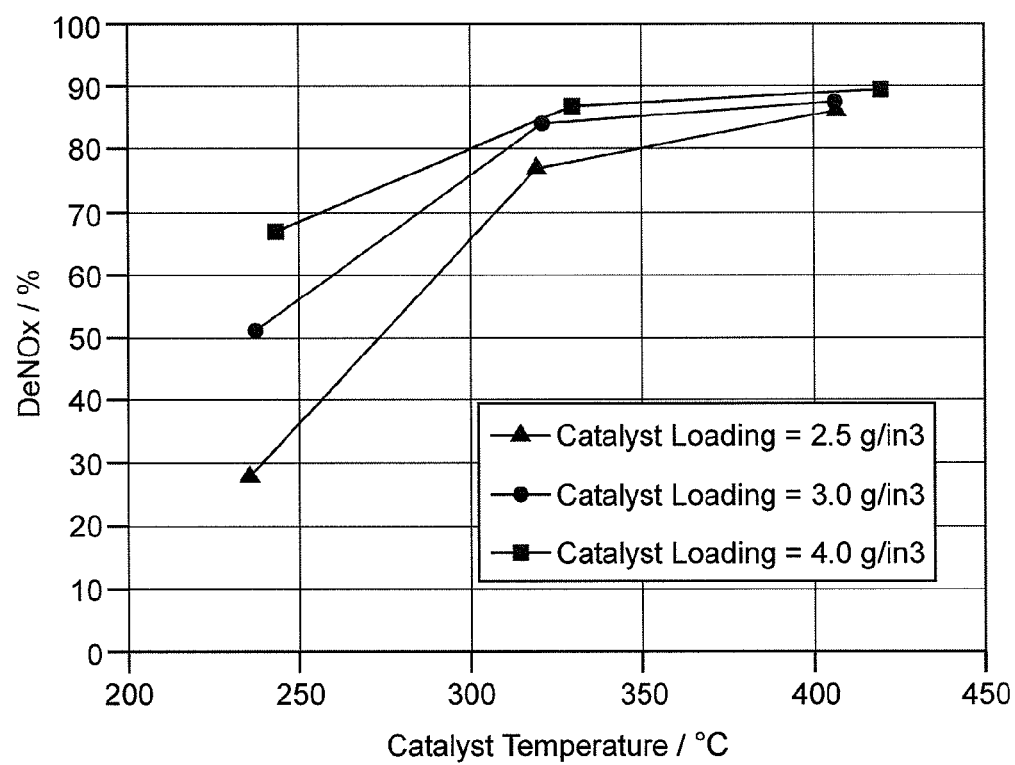
FIG. 10, is a graph showing NOx reduction as a function of temperature for catalysts from comparative examples 3 and 4 and example 5.

Coated honeycombs from comparative examples 3 and 4 and example 5 were evaluated for NOx removal via Selective Catalytic Reduction (SCR) with $NH_3$. These experiments were carried out using a 12.6 liter displacement heavy duty diesel engine. Engine operating conditions were selected to give the same exhaust flow rate over a range of temperatures. Ammonia was added to the exhaust via the in situ decomposition and hydrolysis of urea. Sufficient ammonia was added to maintain a molar $NH_3$:NOx ratio equal to one throughout the test. The concentration of NOx was measured before and after the catalyst to determine the effectiveness of the catalyst in promoting the chemical reaction between ammonia with NOx. Results of these evaluations are summarized in FIG. 10, which shows NOx reduction as a function of temperature for catalysts from comparative examples 3 and 4 and example 5.

This data shows that for temperatures below 350° C., as the amount of the catalyst loading increases, the extent of NOx reduction increases. High NOx conversion is maintained even at higher temperatures where the lower cell density of the high porosity honeycomb (360 for example 5 versus 400 for comparative examples 3 and 4) might be expected to be a disadvantage.

Examples similar to examples 3 and 4 and example 5 were made, but with a vanadia based SCR catalyst. Five examples were prepared each containing catalysts comprising $TiO_2$ onto which $WO_3$, $V_2O_5$ and $SiO_2$ were added. In all cases, the composition of the catalyst remained constant and all catalyst were coated onto two 10.5 inch diameter×6 inch long cordierite ceramic honeycombs.

For comparative example 6, the catalyst was coated on honeycombs with a cell density of 400 cells per square inch (cpsi), with a honeycomb wall thickness of 0.006 inches and with a wall porosity of 35%. This combination of cell density and wall thickness is commonly abbreviated as 400/6. For example 7, a catalyst of the same composition as comparative example 6 was coated on a cordierite ceramic honeycomb with 360 cells per square inch and a honeycomb wall thickness of 0.008 inches. The honeycomb of example 7 had a wall porosity of about 55%. The amount of catalyst coating in Example 7 was 30% higher than in comparative example 6. The higher catalyst loading was possible because of the porous nature of the honeycomb wall. Attempts to coat high loading on the standard porosity honeycomb were unsuccessful because of channel plugging.

In example 8, the same catalyst as in examples 7 was coated on a 400/4 cordierite ceramic honeycomb and at the same catalyst loading. The honeycomb of example 8 is referred to as thin-walled and represents an alternative means of achieving lower pressure drop at higher catalyst coating. In this example, the honeycomb wall porosity and pore size were identical to the standard wall, thicker wall honeycomb.

Example 9 represents yet another attempt to increase catalyst coating without increasing pressure drop. In this example, the cell density is decreased to 300 cpsi and wall thickness to 0.005 inches. This provides a more open channel that has a lesser tendency to plug during coating. This honeycomb was coated with a catalyst having the same composition and loading as example 7, and 8.

Thus, comparative example 6 represents the state of art with respect to catalyst loading on a 400/6 standard porosity honeycomb. Example 7 uses high porous ceramic honeycombs to achieve higher catalyst loading than the current state of the art. Examples 8 and 9 are comparative examples of other approaches to achieve high catalyst loading thought the use of thinner honeycomb walls and by the use of lower cell densities, respectively.

These catalysts were evaluated on a 12.6 liter heavy duty diesel engine calibrated for Euro 4 regulations. The amount of catalyst, 17 liters, represents about two thirds of the SCR catalyst normally used for a Euro 4 engine. Evaluations were done at steady state and using the European Steady state Cycle (ESC) and European Transient Cycle (ETC). The pressure drop across the entire exhaust system was measured at the "C" speed of the engine and 100% torque (C100). The term C speed refers to engine speed as defined the European Union test procedures for the ESC test. The ETC, ESC and C100 are all well defined and well known to those in the field of diesel emissions testing.

Figure 11:
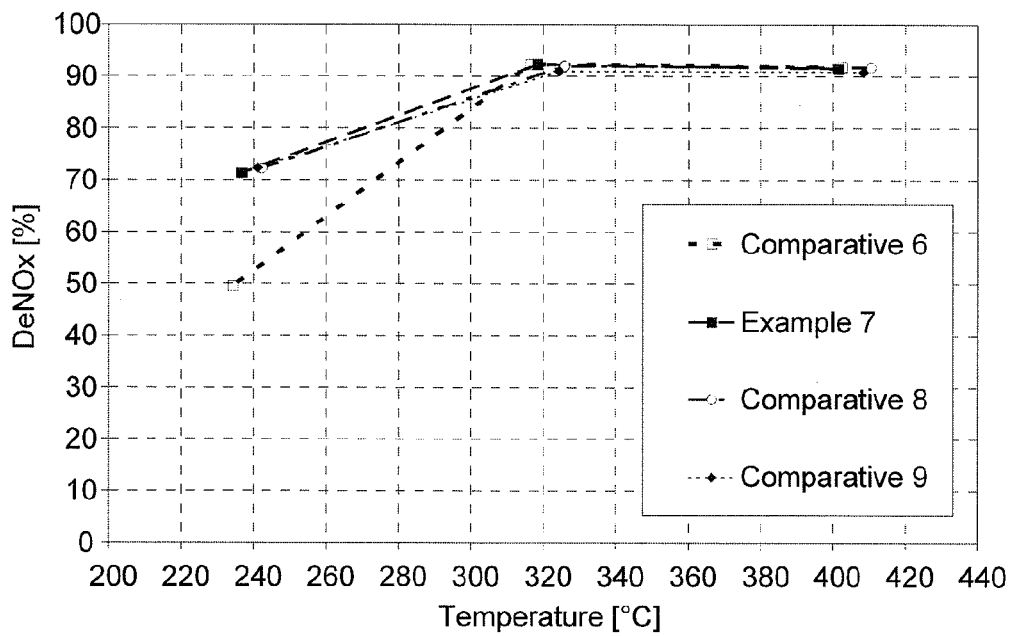
FIG. 11 is a graph showing steady state SCR catalytic activity of comparatives examples 6, 8 and 9 and example 7.

FIG. 11 summarizes the steady state SCR catalytic activity of these examples. Relative to the reference example 6, all show improvement at the 240° C. test temperature. At the 320° and 410° test temperatures all examples show the same performance. This figure demonstrates that higher catalyst loading is beneficial for low temperature operation. At higher temperatures, washcoat loading does not affect catalyst performance. Note that similar results were demonstrated using zeolite based catalysts in examples 3, 4 and 5, above.

Figure 12:
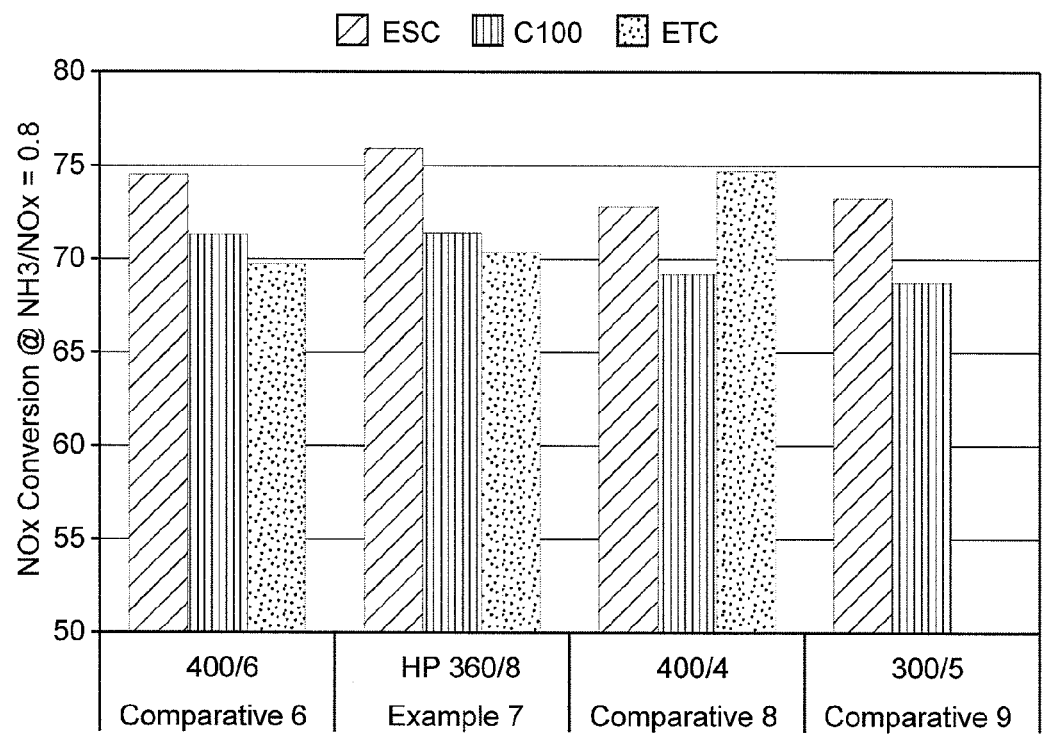
FIG. 12 is a graph showing the NOx reduction measured for comparatives examples 6, 8 and 9 and example 7.

These same coated honeycombs were evaluated using the ESC, the ETC and C100. FIG. 12 summarizes the NOx reduction measured during these experiments. FIG. 12 shows that the despite the lower cell density of example 7, the NOx conversion was at least as good as or better than the other examples. The ETC result from example 9 was, however, an exception. Comparing example 7 to example 8 shows that the current invention gives better performance during both the ESC and C100 tests. An ETC test was not performed using Example 9.

Figure 13:
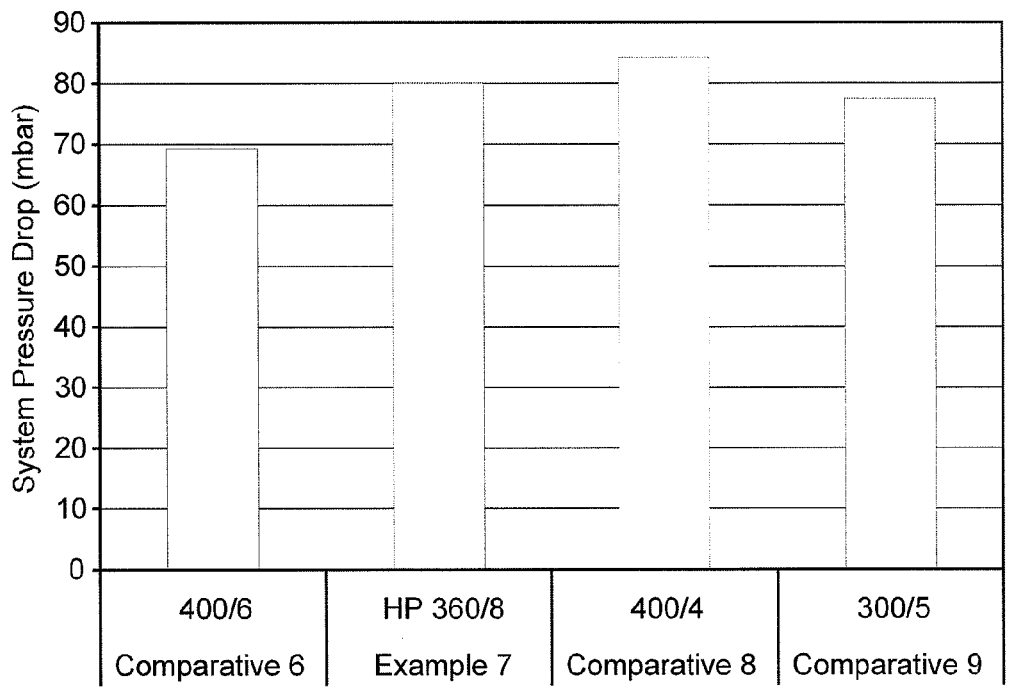
FIG. 13 is a graph showing the pressure drop measured across the exhaust systems for comparatives examples 6, 8 and 9 and example 7.

FIG. 13 summarizes the pressure drop measured across the exhaust systems of the comparative examples 6, 8 and 9 and example 7. This pressure drop represents the pressure drop for the entire exhaust system, but since the only parameter that changed in these three examples was the SCR catalyst, changes in the pressure drop reflect difference in the five examples. The reference catalyst shows the lowest pressure drop, but this catalyst also has 35% less catalyst than in examples 7 thru 9. Comparing catalyst at the same loading, examples 7 thru 9 shows that the sample prepared high porous samples, example 7, had lower pressure drop compared to the thin walled example and about the same as the 300/5 sample. Recall, however, that the NOx reduction activity of example 9 was not as good as proposed technology.

Despite the lower cell density of the higher porosity substrate, there is no loss of catalytic performance at all temperatures.

To demonstrate that the advantages of high porosity honeycombs are not confined to just SCR catalysts, oxidation catalysts were prepared and tested on high porosity and standard porosity honeycombs. The coated catalysts were tested for catalyst adhesion to the substrate and catalytic activity for CO and HC oxidation. Oxidation of these components is generally regarded as indicative of catalyst performance in a diesel engine.

Example 10 and Comparative Example 11

Platinum was dispersed on an aluminum oxide support by incipient wetness followed by fixing with acetic acid. The Pt loaded alumina was prepared as slurry, milled to mean particle size less than 10 microns and coated onto three honeycombs of varying porosity. All of the honeycombs were 300 cpsi, the high porosity (about 60% porosity) honeycomb of example 10 had a wall thickness of 12 mils and the standard porosity honeycomb of comparative example 11 had a wall thickness of 8 mils. After coating, drying and calcinations each the of honeycombs contained 12 g/ft$^3$ Pt and 1.65 g/in$^3$ total washcoat loading.

Figure 14A:
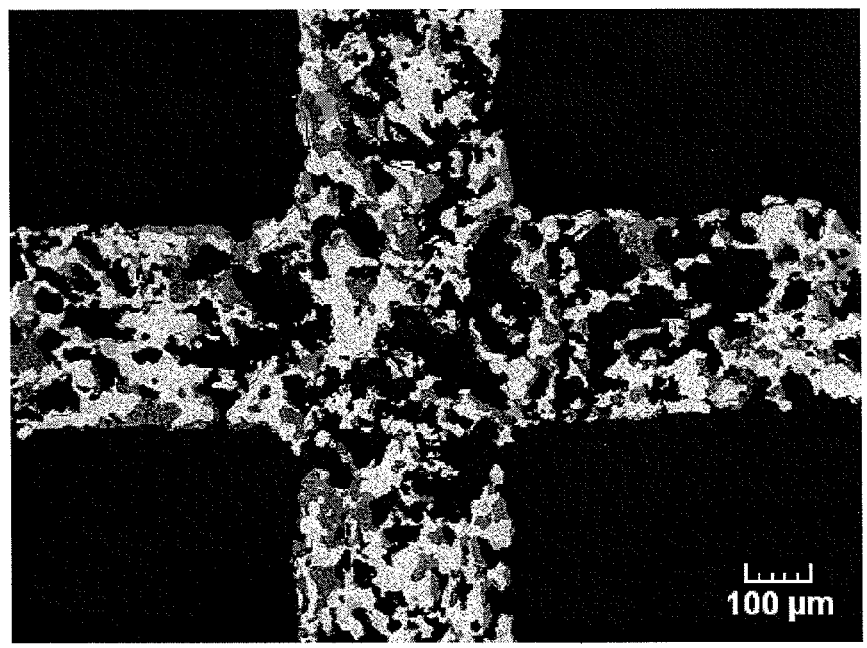
FIGS. 14A and 14B are scanning electron microscope photographs of samples prepared in accordance with example 10.
Figure 14B:
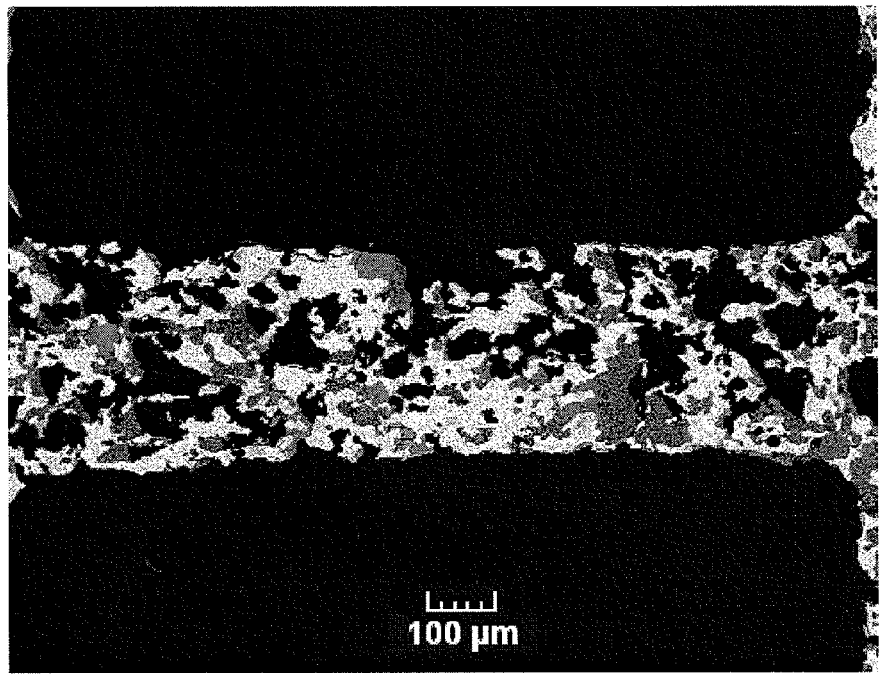
Figure 15A:
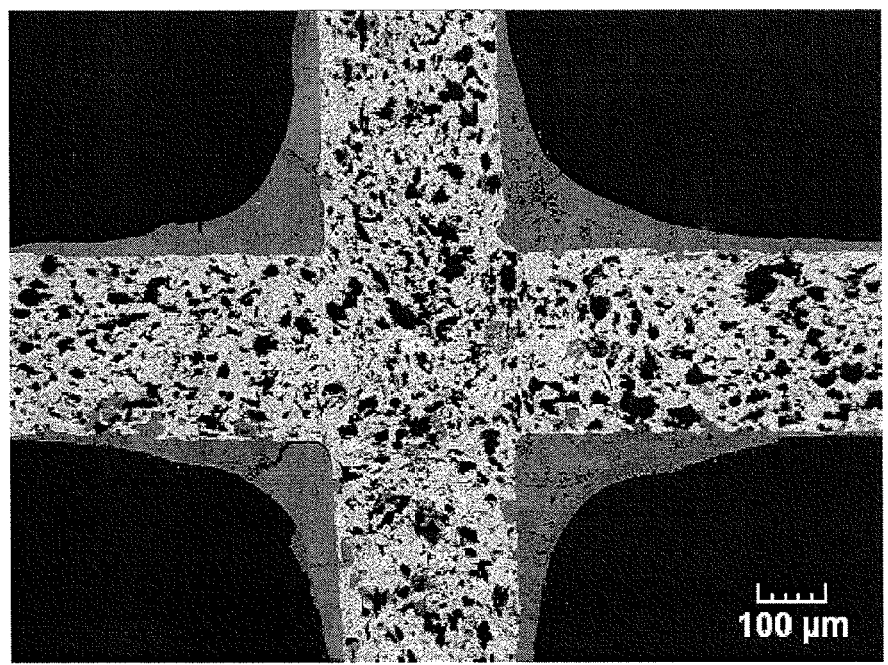
FIGS. 15A and 15B are scanning electron microscope photographs of samples prepared in accordance with comparative example 11.
Figure 15B:
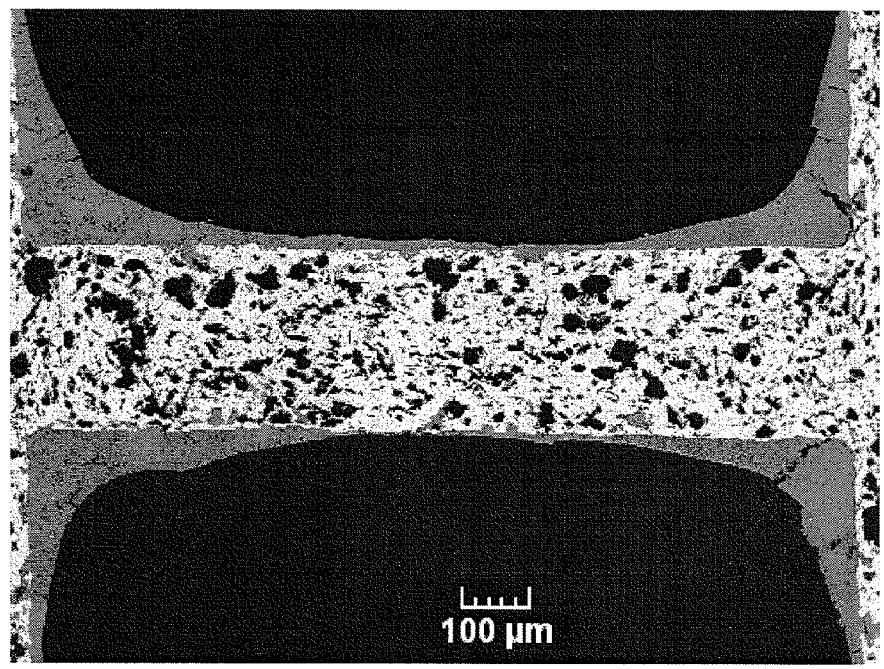

Cross sections of the coated honeycombs were cast into epoxy, polished and examined using a scanning electron microscope. Photographs were taken and are reproduced here as FIGS. 14A, 14B, 15A and 15B. FIGS. 14A and 14B show, at various magnifications and in various regions of the sample, the coating microstructure for samples from honeycombs with ~60% wall porosity. Note that all of the catalytic material has been incorporated into the wall of the honeycomb. In the Figures, the cordierite ceramic appears as the lightest regions, the catalyst appears as gray regions and voids appear black. Similar photographs from a standard porosity honeycomb of comparative example 11 are shown in FIGS. 15A and 15B. For the standard porosity honeycomb, it is evident that while some washcoat has been incorporated into the wall, the majority of the washcoat is on the honeycomb surface. In this case, the presence of added catalyst has altered the channel cross section, by at least about 20%. The coated honeycombs of example 10 and comparative example 11 were evaluated for catalytic activity under conditions described below. Prior to evaluation, the catalysts were aged at 750° C. for 5 hours in 10% water and the balance air. This aging was sufficient to remove fresh catalyst effects. These effects sometimes can lead to significant changes in catalytic performance after very short usage time. This aging allows a comparison of catalytic performance under conditions where the catalyst performance is stable with respect to time.

The testing conditions were as follows:
Space velocity=112,000 hr$^{-1}$ (20 C, 1 atm)
Carbon Monoxide=1020 ppm
Propylene=300 ppm (C1)
Decane=300 ppm (C1)
Water=5%
Oxygen=14%
Carbon Dioxide=4%
NO=100 ppm
Temperature ramp from 80° C. to 400° C. at 10° C./minute The outlet gas composition was monitored throughout the test, and based on the inlet gas composition, it was possible to calculate an ongoing conversion. The resulting conversion plotted vs. the inlet temperature is referred to as a light off curve. One criterion for comparing different catalysts was the temperature corresponding to 50% conversion.

Figure 16:
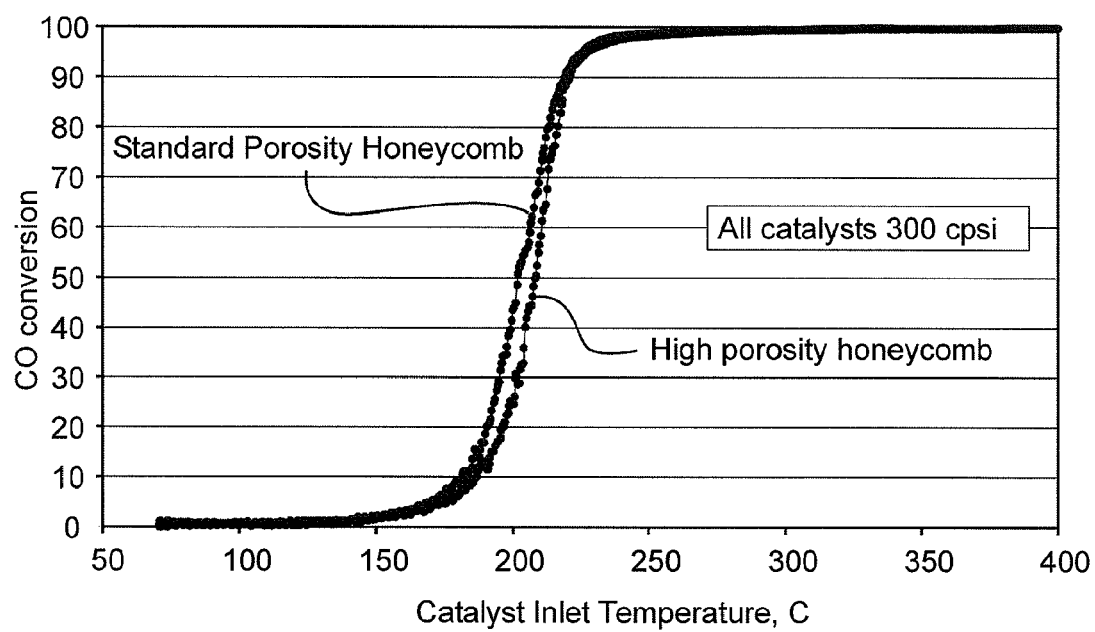
FIG. 16 compares CO light off curves of two coated honeycombs from example 10 and comparative example 11.
Figure 17:
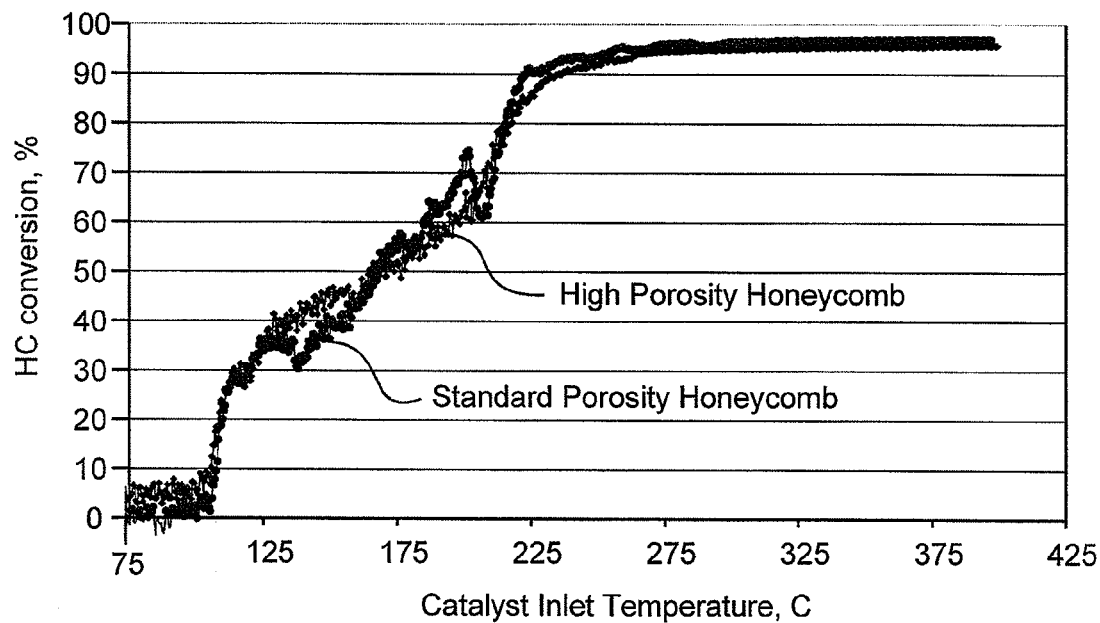
FIG. 17 compares HC light off curves of two coated honeycombs from example 10 and comparative example 11.

FIGS. 16 and 17 compare respectively CO and HC light off curves. As is evident in these figures, there was no difference between the two honeycombs. The result shows that despite the washcoat being located within the walls the honeycomb, there is no loss of catalytic performance of catalytic converters prepared in accordance with embodiments of the present invention.

In the above examples, the washcoat loading and the precious metal content were purposely lowered in an effort to see if diffusional differences could be detected between catalysts coated on standard wall and high porosity honeycombs. In the next set of examples, catalysts were prepared that had catalyst loadings similar to catalyst loadings used in commercial applications.

Example 12 and Comparative Example 13

Pt and Pd were added to aluminum oxide, fixed with acetic acid, milled and then coated on standard and high porosity honeycombs. The Pd and Pt loadings were targeted to achieve a total loading of 100 g/ft$^3$ at a Pt:Pd ratio of 4:1. The high porosity honeycombs in example 12 were 360 cpsi with a wall thickness of 0.008 inches and had a wall porosity of 55%. The honeycomb in comparative example 13 was 400 cpsi with 0.004 inch wall thickness and wall porosity of about 35%. According to an embodiment of the invention, the higher cell density in combination with a thinner wall has been proposed as an alternative to achieve to higher washcoat loading.

With the higher porosity honeycombs of example 12, it was possible to readily achieve washcoat loading greater than 2.35 g/in$^3$. On the other hand, it was difficult to achieve to washcoat loading above 2.0 g/in$^3$ with the standard wall porosity honeycombs of comparative example 13. For activity testing, in order to maintain the same precious metal loading per cubic foot, it was necessary to modify the coatings on comparative example 13 to achieve the same washcoat loading and hence the same precious metal loading.

Test conditions for these catalysts are summarized below. As in examples 10 and 11, these catalysts were aged at 750° C. for 5 hours prior to testing.

Space velocity=50,000 hr−1 (referred to 20 degrees C. and 1 atmosphere pressure)
Decane=133 ppm as C1
Propane=133 ppm as C1
Propylene=134 ppm as C1
CO=1500 ppm
$H_2O$=5%
$CO_2$=5%
$O_2$=10%
NOx as NO=100 ppm
Temperatures were ramped from 80° C. to 400° C. at 15° C./minute.

The catalyst adhesion was tested by subjecting the core to an air knife using 90 psi air directed through 16, 0.006 inch holes. The air knife was passed back and forth across the face the catalyst for 30 seconds. The core was placed in an oven for 30 minutes at 450° C. removed from the oven weighted and then air knifing procedure repeated. The extent of catalyst loss was determined from the weight difference, assuming all the weight loss is ascribed to the catalyst.

Figure 18:
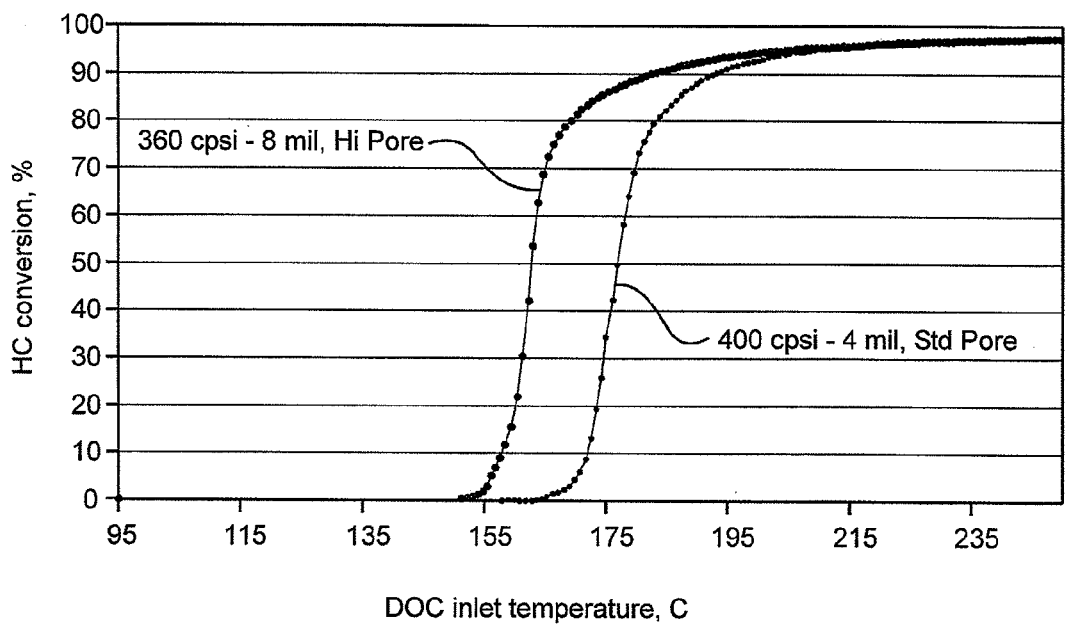
FIG. 18 compares the HC light off of the two coated honeycombs from example 12 and comparative example 13.
Figure 19:
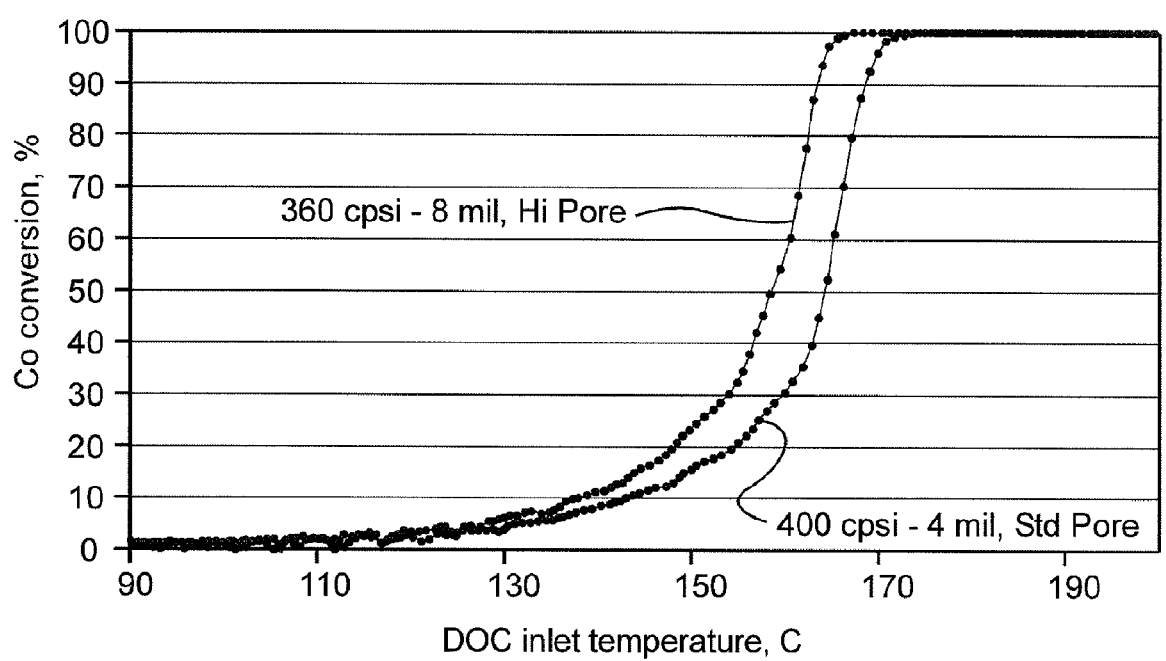
FIG. 19 compares the CO light off of the two coated honeycombs from example 12 and comparative example 13.

FIGS. 18 and 19 compare the HC and CO light off of the two coated honeycombs. In this case, the high porosity honeycomb of example 12 showed significantly lower CO and HC light off compared to the standard honeycomb of comparative example 13, despite the lower cell density of the higher porosity honeycomb.

Coated honeycombs were evaluated for washcoat adhesion. For these samples, no attempt was made to control washcoat loading, thus the high porosity honeycombs had a loading of 2.38 g/in$^3$ and a duplicate sample had 2.64 g/in$^3$ total washcoat loading. The standard porosity honeycomb had a loading of 2.05 g/in$^3$ and a duplicate sample, 1.85 g/in$^3$. Despite the higher catalyst loading on the higher porosity honeycomb, the extent of the washcoat loss was over 5 times greater on the standard honeycomb compared to high porosity honeycomb (0.26% vs. 1.36%) Loss of washcoat can lead to catalyst deactivation and also potential deactivation of other downstream catalysts such as SCR catalysts.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A gas treatment article comprising:
   a flow through substrate comprising an inlet axial end, an outlet axial end, wall elements having a length extending between the inlet axial end to the outlet axial end and a plurality of axially enclosed, open-ended channels defined by the wall elements, the walls having a porosity of at least 50% and an average pore size of at least 5 microns and less than about 100 microns and the surface of the walls having an average roughness defined by open pores on the surface of the walls; and
   a composite catalyst in the form of a washcoat containing particles having an average particle size greater than about 3 microns deposited substantially within the wall elements, wherein the average roughness of the surface of the wall elements remains substantially unchanged from prior to loading of the catalyst within the walls.

2. The article of claim 1, wherein a substantial portion of pores are interconnected and extend through the wall elements and the washcoat is located substantially within the interconnected pores.

3. The article of claim 2, wherein the pores have a mean pore size greater than about 20 microns and the porosity of the walls being up to about 70%.

4. The article of claim 2, wherein the pores have a mean pore size greater than about 30 microns and the porosity of the walls being up to about 70%.

5. The article of claim 2, wherein at a washcoat loading of up to about 2.0 g/in$^3$, the channels are substantially free of fillets.

6. The article of claim 5, wherein at a washcoat loading of up to about 2.5 g/in$^3$, the channels exhibit a loss in cross-sectional area after coating compared to an uncoated channel of less than about 20%.

7. The article of claim 2, wherein at least about 75% of the washcoat is located within the inside of the wall elements.

8. The article of claim 7, wherein at least about 90% of the washcoat is located within the inside of the wall elements.

9. The article of claim 2, wherein the particle size of the particles in the washcoat is in the range of about 5 and 10 microns.

10. The article of claim 1, wherein the washcoat contains one or more catalysts for the abatement of NOx in an exhaust gas stream.

11. The article of claim 10, wherein the catalyst contains one or more of a zeolite and a non-zeolitic aluminosilicate having the CHA structure.

12. The article of claim 10, wherein the article is a NOx storage and release (NSR) catalytic converter.

13. The article of claim 10, wherein the article is a selective catalytic reduction (SCR) catalyst.

14. The article of claim 10, wherein the catalyst contains one or more of a natural zeolite, a synthetic zeolite, faujasite, chabazite, clinoptilolite, mordenite, silicalite, zeolite X, zeolite Y, ultrastable zeolite Y, ZSM zeolite, offretite, beta zeolite, USY zeolite, ZSM-20 zeolite, zeolites having the CHA structure, chabazite and SAPO materials.

15. The article of claim 10, wherein the catalyst contains $V_2O_5$.

16. The article of claim 1, wherein the article contains a catalytic material effective to oxidize CO and HC.

17. The article of claim 16, wherein the catalyst material comprises a precious metal component on metal oxide(s) support particles.

18. A gas treatment article comprising:
a flow through substrate comprising an inlet axial end, an outlet axial end, wall elements having a length extending between the inlet axial end to the outlet axial end and a plurality of axially enclosed, open-ended channels defined by the wall elements having an axial surface and a wall interior, the channels defining a cross-section having an uncoated channel area, the walls having a porosity of at least 50% and an average pore size of at least 5 microns and less than about 100; and
a composite catalyst in the form of a washcoat containing particles having an average particle size greater than about 5 microns and less than about 15 microns deposited at a loading of up to 2.0 g/in³ substantially in the wall interior such that the loss in channel area upon coating with the washcoat is less than about 20% of the uncoated channel area.

19. The article of claim 18, wherein the loss in channel area upon coating with the washcoat is less than about 10% of the uncoated channel area.

20. The article of claim 18, wherein the catalyst comprises a catalyst effective to oxidize carbon monoxide and hydrocarbons in an exhaust gas stream.

21. The article of claim 18, wherein the catalyst comprises a catalyst effective to abate NOx in an exhaust gas stream.

22. A method of forming a catalytic article comprising:
providing a flow through substrate comprising an inlet axial end, an outlet axial end, wall elements having a length extending between the inlet axial end to the outlet axial end and a plurality of axially enclosed, open-ended channels defined by the wall elements having an axial surface and a wall interior, the channels defining a cross-section having an uncoated channel area, the walls having a porosity of at least 50% and an average pore size of at least 5 microns and less than about 100; and
immersing the substrate in a composite catalyst in the form of a slurry containing particles having an average particle size greater than about 5 microns and less than about 15 microns so that the slurry forms a washcoat deposited at a loading of up to 2.0 g/in³ substantially in the wall interior such that the loss in channel area upon coating with the washcoat is less than about 20% of the uncoated channel area.

23. The method of claim 22, wherein the loss in channel area upon forming the washcoat is less than about 10% of the uncoated channel.

\* \* \* \* \*